United States Patent
Ohgose et al.

(10) Patent No.: US 11,849,124 B2
(45) Date of Patent: *Dec. 19, 2023

(54) DEVICE AND METHOD OF VIDEO ENCODING WITH FIRST AND SECOND ENCODING CODE

(71) Applicant: Panasonic Intellectual Property Corporation of America, Torrance, CA (US)

(72) Inventors: Hideyuki Ohgose, Osaka (JP); Kiyofumi Abe, Osaka (JP); Hiroshi Arakawa, Nara (JP); Tatsuro Juri, Osaka (JP); Kazuhito Kimura, Shiga (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,698

(22) Filed: Mar. 4, 2022

(65) Prior Publication Data
US 2022/0191517 A1 Jun. 16, 2022

Related U.S. Application Data

(63) Continuation of application No. 16/751,967, filed on Jan. 24, 2020, now Pat. No. 11,303,910, which is a (Continued)

(30) Foreign Application Priority Data

Mar. 9, 2011 (JP) .................................. 2011-051221

(51) Int. Cl.
*H04N 19/176* (2014.01)
*H04N 19/103* (2014.01)
(Continued)

(52) U.S. Cl.
CPC ......... *H04N 19/176* (2014.11); *H04N 19/103* (2014.11); *H04N 19/146* (2014.11);
(Continued)

(58) Field of Classification Search
CPC .... H04N 19/176; H04N 19/50; H04N 19/436; H04N 19/146; H04N 19/103
See application file for complete search history.

(56) References Cited

U.S. PATENT DOCUMENTS 6,009,236 A 12/1999 Mishima et al.
6,647,061 B1 11/2003 Panusopone et al.
(Continued)

FOREIGN PATENT DOCUMENTS

CN 101835055 9/2010
CN 101926177 12/2010
(Continued)

OTHER PUBLICATIONS

International Search Report (ISR) dated Jun. 5, 2012 in International (PCT) Application No. PCT/JP2012/001665.
(Continued)

*Primary Examiner* — Richard T Torrente
(74) *Attorney, Agent, or Firm* — WENDEROTH, LIND & PONACK, L.L.P.

(57) ABSTRACT

A video image encoding device, in a first mode, variable-length-encodes a residual coefficient to generate a coefficient code string, outputs the coefficient code string and the header information in a state in which the header information is associated with the coefficient code string, in a second mode, directly uses a differential image as a coefficient code string without variable-length-encoding the differential image, and outputs the coefficient code string and the header information in a state in which the header information is associated with the coefficient code string.

2 Claims, 14 Drawing Sheets

Related U.S. Application Data continuation of application No. 14/021,207, filed on Sep. 9, 2013, now Pat. No. 10,757,422, which is a continuation of application No. PCT/JP2012/001665, filed on Mar. 9, 2012.

(51) Int. Cl.
| | | |
|---|---|---|
| *H04N 19/436* | (2014.01) | |
| *H04N 19/146* | (2014.01) | |
| *H04N 19/50* | (2014.01) | |
| *G06T 9/00* | (2006.01) | |
| *H04N 19/124* | (2014.01) | |

(52) U.S. Cl.
CPC ............ *H04N 19/436* (2014.11); *G06T 9/004* (2013.01); *H04N 19/124* (2014.11); *H04N 19/50* (2014.11)

(56) References Cited

U.S. PATENT DOCUMENTS

| | | | |
|---|---|---|---|
| 2004/0086045 | A1 | 5/2004 | Yoneyama |
| 2005/0147308 | A1 | 7/2005 | Kitamura |
| 2007/0041450 | A1 | 2/2007 | Kim et al. |
| 2007/0133892 | A1 | 6/2007 | Chiba et al. |
| 2008/0151999 | A1* | 6/2008 | Youn .................. H04N 19/137 375/240.18 |
| 2008/0165858 | A1 | 7/2008 | Karczewicz et al. |
| 2008/0170615 | A1 | 7/2008 | Sekiguchi et al. |
| 2008/0181304 | A1 | 7/2008 | Sekiguchi et al. |
| 2008/0225947 | A1* | 9/2008 | Narroschke .......... H04N 19/126 375/E7.076 |
| 2009/0175334 | A1 | 7/2009 | Ye et al. |
| 2010/0303149 | A1 | 12/2010 | Yasuda et al. |
| 2011/0103475 | A1 | 5/2011 | Alshina et al. |
| 2011/0150072 | A1* | 6/2011 | Han ...................... H04N 19/15 375/E7.026 |
| 2012/0082232 | A1* | 4/2012 | Sole Rojals ........... H04N 19/64 375/240.18 |
| 2012/0224640 | A1 | 9/2012 | Sole Rojals |
| 2013/0128966 | A1 | 5/2013 | Gao |

FOREIGN PATENT DOCUMENTS

| | | |
|---|---|---|
| EP | 1 489 850 | 12/2004 |
| JP | 9-23433 | 1/1997 |
| JP | 2007-166039 | 6/2007 |
| JP | 2008-172599 | 7/2008 |
| JP | 2009-105696 | 5/2009 |
| JP | 2009-272727 | 11/2009 |
| JP | 2010-521113 | 6/2010 |
| JP | 2010-193398 | 9/2010 |
| JP | 2010-193399 | 9/2010 |
| JP | 2010-531552 | 9/2010 |
| KR | 10-2010-0015448 | 2/2010 |
| WO | 03/084243 | 10/2003 |
| WO | 2008/086316 | 7/2008 |
| WO | 2008/110535 | 9/2008 |
| WO | 2010/002214 | 1/2010 |

OTHER PUBLICATIONS

ITU-T H.264: Advanced video coding for generic audiovisual services, Mar. 2010.
Keiichi Chono et al., Pulse code modulation mode for HEVC, Joint Collaborative Team on Video Coding (JCT-VC) of ITU-T SG16 WP3 and ISO/IEC JTC1/SC29/WG11, JCTVC-D044-reV1, 4th Meeting, pp. 1-9, Jan. 2011.
Japanese Office Action dated Nov. 5, 2013 in Japanese Patent Application No. 2013-503408.
Matthias Narroschke et al., Adaptive prediction error coding in spatial and frequency domain for H.264/AVC, ITU—Telecommunications Standardization Sector Study Group 16 Question 6 Video Coding Experts Group (VCEG), 29th Meeting: Bangkok, Thailand, VCEG-AB06, pp. 1-13, Jan. 2006.
English translation of the International Preliminary Report on Patentability dated Sep. 19, 2013 in International (PCT) Application No. PCT/JP2012/001665.
English translation of the International Preliminary Report on Patentability dated Sep. 19, 2013 in International (PCT) Application No. PCT/JP2012/001666.
Extended European Search Report dated Jul. 15, 2014 in corresponding European patent application No. 127557205.
Extended European Search Report dated Jul. 15, 2014 in corresponding European patent application No. 127545507.
Sullivan G. J. et al., "The H.264/Avc Advanced Video Coding Standard. Overview and Introduction to the Fidelity Range Extensions", Proceedings of SPIE, SPIE—International Society for Optical Engineering, US, vol. 5558, Nov.1, 2004, pp. 454-474, XP002340590.
Keiichi Chono et al., "Local Fukugo Gazo o Mochita H.264MB Jogen Bit Junshu PCM Fugoka Hoho // A PCM Coding Method using Decoded Images for obeying the upper limit on the number of bits of MB in H.264 encoding", 2006 Picture Coding Symposium of Japan (PCSJ2006), Japan, Nov. 1, 2006, pp. 119-120, XP008118266.
Japanese Office Action dated Jan. 6, 2015 in corresponding Japanese Patent Application No. 2013-503408.
Impress Hyoujun Kyoukasho siriizu, Kaiteiban H.264/AVC kyoukasho, Jan. 1, 2006, with partial English translation, and cited in the Japanese Office Action.
Impress Hyoujun Kyoukasho siriizu, translation). Kaiteiban H.264/Avc kyoukasho Jan. 1, 2006, pp. 199-200 (with partial English translation).
European Office Action dated Aug. 25, 2015 in corresponding European Application No. 12755720.5.
European Office Action dated Aug. 26, 2015 in corresponding European Application No. 12754550.7.
Office Action dated Mar. 1, 2016 in U.S. Appl. No. 14/021,153.
Office Action dated Mar. 28, 2016 in Chinese Application No. 201280012443.1, with partial English translation.
English translation of Search Report dated Mar. 2, 2016 in Chinese Application No. 201280012378.2.
Office Action dated Jul. 27, 2016 in U.S. Application No. 14/021,153.
Office Action dated Aug. 12, 2016 in Chinese Application No. 201280012443.1, with partial English translation.
Office Action dated Jan. 23, 2017 in U.S. Appl. No. 14/021,153.
Office Action dated May 31, 2017 in European Application No. 12755720.5.
Office Action dated May 31, 2017 in European Application No. 12754550.7.
McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11, 1st Meeting: Dresden, DE Apr. 2010, JCTVC-A124, pp. 1-11.
Office Action dated Dec. 20, 2017 in U.S. Appl. No. 14/021,153.
Office Action dated Jun. 8, 2018 in U.S. Appl. No. 14/021,153.
Office Action dated Oct. 29, 2018 in U.S. Appl. No. 14/021,153.
Office Action dated Mar. 28, 2019 in U.S. Appl. No. 14/021,153.
Wiegand et al., "WD1: Working Draft 1 of High-Efficiency Video Coding", JCTVC-C403, 3$^{rd}$ Meeting: Guangzhou, CN, Oct. 7-15, 2010, 137 pp.

* cited by examiner

Fig.3

```
coding_unit( ) {
  pred_mode;
  prediction_unit ( );
  qp_value;
  {
  pcm_flag;
  if ( pcm_flag == 1 ) {
    pcm_data( );
  } else {
    residual_data( );
  }
  }
}
``` pcm_flag;

0: COEFFICIENT CODE STRING IN RESIDUAL MODE
1: COEFFICIENT CODE STRING IN PCM MODE

Fig.4

```
coding_unit( ) {
    pred_mode;
    prediction_unit ( );
    qp_value;
    {
    cpb_yuv_root;
    if ( cpb_yuv_root == 8 ) {
        pcm_data( );
    } else {
        residual_data( );
    }
    }
}
``` cpb_yuv_root;

0~7: COEFFICIENT CODE STRING IN RESIDUAL MODE
1: COEFFICIENT CODE STRING IN PCM MODE

Fig.5

```
coding_unit() {
    pred_mode;
    prediction_unit ( );
    qp_value;
    {
    residual_data_flag;
    if ( residual_data_flag == 2 ) {
        pcm_data();
    } else {
        residual_data();
    }
    }
}
``` residual_data_flag;

0: NO COEFFICIENT INFORMATION
1: COEFFICIENT CODE STRING IN RESIDUAL MODE
2: COEFFICIENT CODE STRING IN PCM MODE

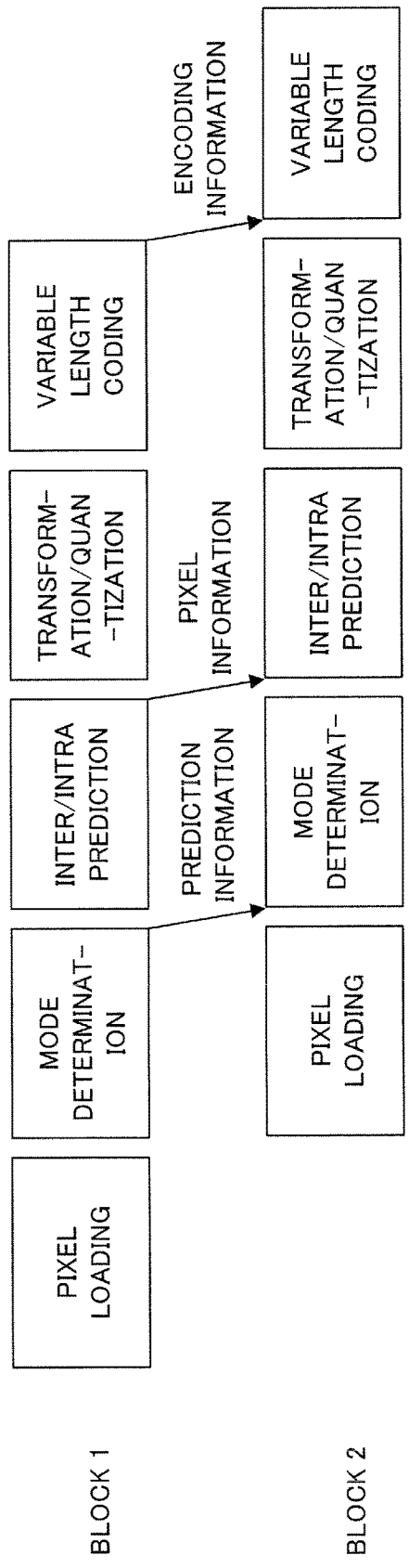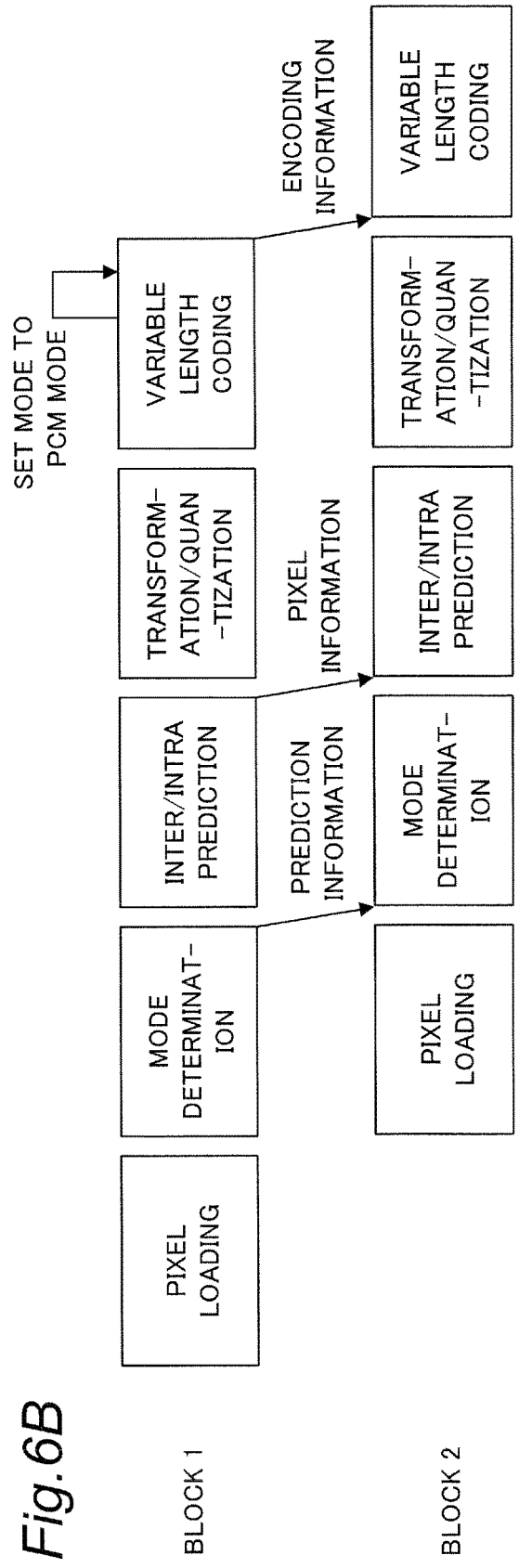

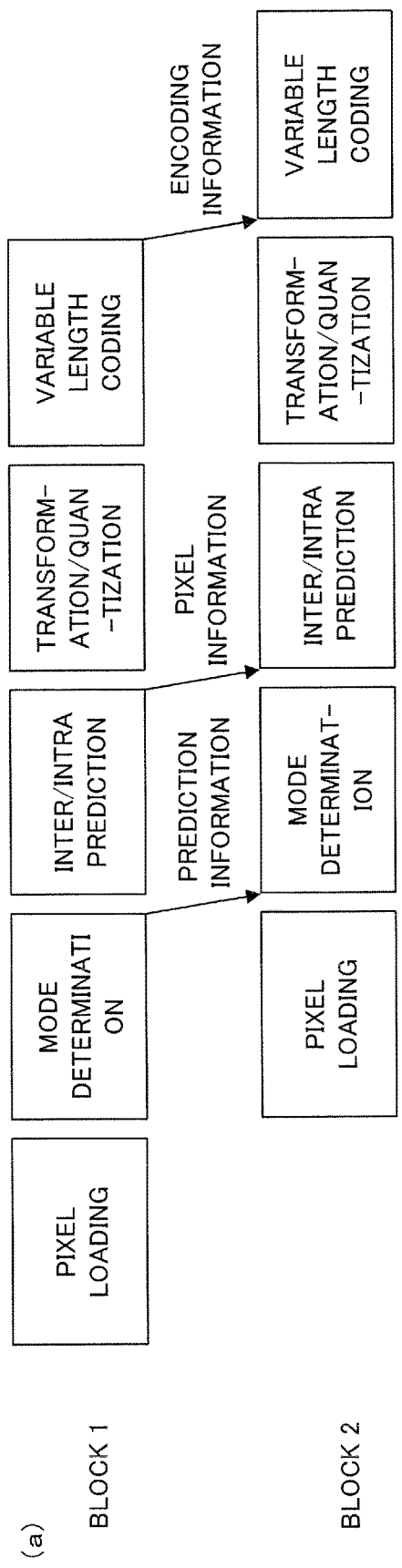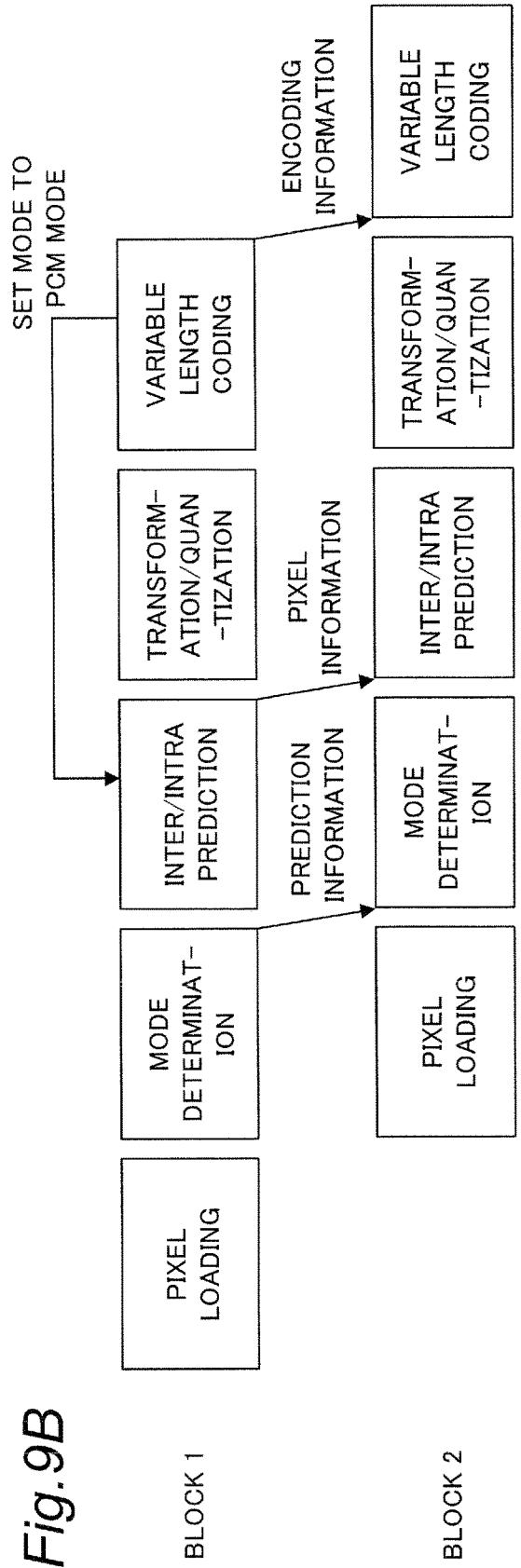

DEVICE AND METHOD OF VIDEO ENCODING WITH FIRST AND SECOND ENCODING CODE

BACKGROUND

1. Technical Field

The present disclosure relates to a video image encoding device that encodes a video image such that the video image is divided into blocks.

2. Related Art

In recent years, with development of multimedia applications, it has been popularized that information of all kinds of media such as images, sounds, and texts are uniformly handled. Since a digitized image has huge volumes of data, an image information compression technique is indispensable to accumulate and transmit the image. On the other hand, to mutually operate compressed image data, standardization of compression techniques is also important. For example, as standards of measure of image compression techniques, H.261, H.263, and H.264 of ITU-T (telecommunication standardization sector in International Telecommunication Union), MPEG-1, MPEG-3, MPEG-4, and MPEG-4AVC of ISO/IEC (International Organization for Standardization), and the like are given. At present, a standardization action for a next-generation screen encoding scheme obtained by the collaboration between ITU-T and ISO/IEC and called HEVC has been advanced.

In such encoding of a video image, each picture to be encoded is divided into encoding unit blocks, and redundancies in time and spatial directions are reduced in units of blocks to compress an amount of information. In inter predictive encoding to reduce a time redundancy, detection of motion and formation of a predictive image are performed in units of blocks with reference to a forward or a backward picture to obtain a differential image between the obtained predictive image and an input image of a block to be encoded. In intra predictive encoding to reduce a spatial redundancy, a predictive image is generated from pixel information of peripheral encoded blocks to obtain a differential image between the obtained predictive image and an input image of a block to be encoded. In addition, orthogonal transformation such as discrete cosine transformation and quantization are performed to the obtained differential image, and a code string is generated by using variable-length-coding to compress an amount of information.

In decoding, the code string generated by the encoding process is analyzed to obtain prediction information and residual coefficient information, inter predictive decoding and intra predictive decoding are performed by using the prediction information to generate a predictive image, inverse quantization and inverse orthogonal transformation are performed to the residual coefficient information to generate a differential image, and the obtained predictive image and the differential image are added to each other to decompress a final output image.

In H.264 (ITU-T H.264: Advanced video coding for generic audiovisual services (March 2010)), in order to restrict an upper limit of an amount of processing in each block, a maximum value of an amount of codes generated in each block is defined (more specifically, 3200 bits). When the above normal encoding process is performed, a code string including an amount of code larger than the maximum value of the amount of generated codes may be generated depending on the quality of an input image or conditions of a quantization process. For this reason, a special encoding mode called an IPCM is used to make it possible to suppress the amount of code of the code string to be smaller than the maximum value.

The IPCM is different from a normal encoding mode, and is a mode in which pixel values of an input image are directly described as a bit string in a code string without performing generation, orthogonal transformation/quantization of a differential image by intra/inter prediction. In use of the mode, for example, when the format of an input image is YUV4:2:0 in which each pixel has 8 bits, a block of a luminance component has 16×16 pixels, and each block of two color-difference components has 8×8 pixels. For this reason, the total number of bites is 384 bytes, and the number of bits of the input image including information required for a header can be suppressed in an amount equal to or smaller than 3200 bits, i.e., the maximum value described above.

SUMMARY

In a large number of video image encoding/decoding devices, an encoding/decoding process is achieved by an integrated circuit called an LSI. Such an encoding/decoding device employs a configuration that enables a parallel operation called a pipeline to be performed to increase a processing speed. More specifically, before a process of one block is completed, a process of the next block is started to cause the processes to simultaneously proceed.

FIG. 14(a) shows an example of a pipeline in encoding. To a block 1, processes including pixel loading, mode determination (determination whether a mode is set to an inter prediction mode or an intra prediction mode), inter/intra prediction, transformation/quantization, and variable-length-coding are sequentially applied, and the same processes as described above are also applied to a block 2. At this time, the block 2 starts the process immediately after pixel loading of the block 1 is completed to perform processes in parallel to each other while process timings are delayed every step. In the encoding/decoding process of H.264 or HEVC, since processes are executed with reference to information of blocks that encoded/decoded in the past, processes to the block 2 is need to be executed with reference to process prediction information, pixel information, encoding information, and the like that are fixed in the block 1 as shown in the drawing.

However, it cannot be determined whether the amount of code generated in each block is suppressed in an amount equal to or smaller than the maximum value by an amount of code is examined upon completion of the variable-length-coding. For this reason, if it is determined that the amount of code exceeds the maximum value, at this time, the mode must be switched to the IPCM to generate a code string again.

FIG. 14(b) shows an example of a pipeline obtained when switching to the IPCM occurs. It is assumed that switching to the IPCM is fixed in the variable-length-coding process in a block 1. However, at this time, in a block 2, the encoding process has proceeded with reference to prediction information, pixel information, and the like obtained when the block 1 performs normal encoding. For this reason, returning to mode determination in the block 1, the block 1 must update information that is referred on the assumption that encoding is performed in the IPCM to perform the process in the block 2 again.

Controlling to retrace the pipeline requires very complex processing control. When the number of times of retracing is increased when the IPCM occurs in a target picture many times, a decrease in processing speed is caused, and an encoding process of the target picture cannot be completed in the required time.

One non-limiting and exemplary embodiment provides an encoding method that, in a video image encoding device having a pipeline structure, can suppress an amount of code generated in each block to be equal to or less than a specific maximum value while suppressing a pipeline from being retraced and that can be replaced with a conventional IPCM.

A video image encoding device according to a first aspect of the disclosure is a video image encoding device that encodes an input video image in units of blocks, and includes a predictive encoder that generates a predictive image corresponding to an image to be encoded, a subtracter that generates a differential image between the image to be encoded and the generated predictive image, a predictive residual encoder that performs an orthogonal transformation process and a quantizing process to an output from the subtracter to generate a residual coefficient, a predictive residual decoder that performs an inverse quantizing process and an inverse orthogonal transformation process to the residual coefficient to generate a residual decoded image, an adder that adds the predictive image generated by the predictive encoder and the residual decoded image generated by the predictive residual decoder to each other to generate a reconstructed image, a header code string generator that generates header information including at least prediction information used in generating the predictive image, and a coefficient code string generator that, in a first mode, variable-length-codes the residual coefficient generated by the predictive residual encoder to generate a coefficient code string, outputs the coefficient code string and the header information in a state in which the header information generated by the header code string generator is associated with the coefficient code string, in a second mode, directly uses the differential image as a coefficient code string without variable-length-coding the differential image generated by the subtracter, and outputs the coefficient code string and the header information in a state in which the header information generated by the header code string generator is associated with the coefficient code string.

A video image encoding device according to a second aspect of the disclosure is a video image encoding device that encodes an input video image in units of blocks, and includes a predictive encoder that generates a predictive image corresponding to an image to be encoded, a subtracter that generates a differential image between the image to be encoded and the generated predictive image, a predictive residual encoder that performs an orthogonal transformation process and a quantizing process to an output from the subtracter to generate a residual coefficient, a predictive residual decoder that performs an inverse quantizing process and an inverse orthogonal transformation process to the residual coefficient to generate a residual decoded image, an adder that adds the predictive image generated by the predictive encoder and the residual decoded image generated by the predictive residual decoder to each other to generate a reconstructed image, a header code string generator that generates header information including at least prediction information used in generating the predictive image, and a coefficient code string generator that, in a first mode, variable-length-codes the residual coefficient generated by the predictive residual encoder to generate a coefficient code string, outputs the coefficient code string and the header information in a state in which the header information generated by the header code string generator is associated with the coefficient code string, in a second mode, variable-length-codes the differential image generated by the subtracter, directly uses the differential image as a coefficient code string, and outputs the coefficient code string and the header information in a state in which the header information generated by the header code string generator is associated with the coefficient code string.

A video image encoding device according to a third aspect of the disclosure is a video image encoding device that encodes an input video image in units of blocks, and includes a predictive encoder that generates a predictive image corresponding to an image to be encoded, a subtracter that generates a differential image between the image to be encoded and the generated predictive image, a predictive residual encoder that performs an orthogonal transformation process and a quantizing process to an output from the subtracter to generate a residual coefficient, a predictive residual decoder that performs an inverse quantizing process and an inverse orthogonal transformation process to the residual coefficient to generate a residual decoded image, an adder that adds the predictive image generated by the predictive encoder and the residual decoded image generated by the predictive residual decoder to each other to generate a reconstructed image, a header code string generator that generates header information including at least prediction information used in generating the predictive image, and a coefficient code string generator that, in a first mode, variable-length-codes the residual coefficient generated by the predictive residual encoder to generate a coefficient code string, outputs the coefficient code string and the header information in a state in which the header information generated by the header code string generator is associated with the coefficient code string, in a second mode, directly uses the residual decoded image as a coefficient code string without variable-length-coding the residual decoded image generated by the predictive residual decoder, and outputs the coefficient code string and the header information in a state in which the header information generated by the header code string generator is associated with the coefficient code string.

The present disclosure can also generate means included in the video image encoding device and processes equivalent to the means as a program or an integrated circuit.

According to an encoding apparatus of a first aspect of the present disclosure, in a first mode, a residual coefficient generated by a predictive residual encoder is variable-length-coded to generate a coefficient code string, and, in a state in which header information generated by a header code string generator is associated with the coefficient code string, the coefficient code string and the header information are output. On the other hand, in a second mode, without variable-length-coding a residual decoded image generated by a predictive residual decoder, the residual decoded image is directly used as a coefficient code string, and, in a state in which header information generated by a header information code string generator is associated with the coefficient code string, the coefficient code string and the header information are output. The residual decoded image mentioned here is based on the same input image as that of the residual coefficient. In a decoding device, when the residual coefficient is decoded by using prediction information configuring a combination to the coefficient, the same image as the residual decoded image can be obtained. More specifically, pixel information of a reconstructed image finally generated in the decoding device in the first mode is the same as that in the second mode. For this reason, even though the second mode is used, a change in prediction information described in a header code string and re-encoding are not necessary. For this reason, a process in another block in which an encoding process proceeds with reference to prediction information and pixel information of the current block is not influenced at all. Thus, only a coefficient code string can be directly encoded in a PCM mode without retracing the pipeline. Thus, in the encoding device having a pipeline structure, an amount of code generated in each block can be suppressed in an amount equal to or smaller than a specific maximum value without decreasing a processing speed or increasing an amount of processing.

According to an encoding device of a second aspect of the present disclosure, the same effect as that in the encoding device according to the first aspect can be obtained while variable-length-coding a differential image.

According to an encoding apparatus of a third aspect of the present disclosure, in a first mode, a residual coefficient generated by a predictive residual encoder is variable-length-coded to generate a coefficient code string, and, in a state in which header information generated by a header code string generator is associated with the coefficient code string, the coefficient code string and the header information are output. On the other hand, in the second mode, a code string obtained without variable-length-coding a differential image output from a subtracter is additionally written subsequently to a code string generated by the header code string generator to generate a final code string. The residual coefficient mentioned here is based on the same input image as that of the residual image. For this reason, even though the current block is switched to a PCM mode, a change of prediction information described in the header code string is unnecessary. However, when a residual coefficient in the decoding device is decoded by using prediction information configuring a combination to the corresponding signal, an image different from the differential image is generated. For this reason, pixel information of a reconstructed image finally obtained in the decoding device when encoding is performed in the first mode is different from that obtained when encoding is performed in the second mode. At this time, an encoding process of another block that refers to pixel information of the current block proceeds. For this reason, even in the other block, the process must be executed again by replacing the pixel information. Thus, the process must retrace an inter/intra prediction process of the current block. However, in comparison with conventional control, since the process does not need to retrace mode determination, the number of processes to be retraced can be reduced. Thus, in the encoding device having a pipeline structure, encoding can be performed while suppressing the pipeline from being retraced. Thus, in the encoding device having a pipeline structure, an amount of code generated in each block can be suppressed in an amount equal to or smaller than a specific maximum value while suppressing a decrease in processing speed or an increase in an amount of processing.

BRIEF DESCRIPTION OF DRAWINGS

FIG. 3 is a conceptual diagram for explaining an example of the syntax of a code string generated in the first embodiment.

FIG. 4 is a conceptual diagram for explaining another example of the syntax of the code string generated in the first embodiment.

FIG. 5 is a conceptual diagram for explaining still another example of the syntax of the code string generated in the first embodiment.

FIGS. 6A and 6B are conceptual diagrams for explaining pipeline control of a video image encoding device according to the first embodiment.

FIGS. 9A and 9B are conceptual diagrams for explaining pipeline control of the video image encoding device according to the second embodiment.

DETAILED DESCRIPTION

First Embodiment

A video image encoding device according to a first embodiment will be described below with reference to the drawings.

1. CONFIGURATION OF VIDEO IMAGE ENCODING DEVICE

Figure 1:
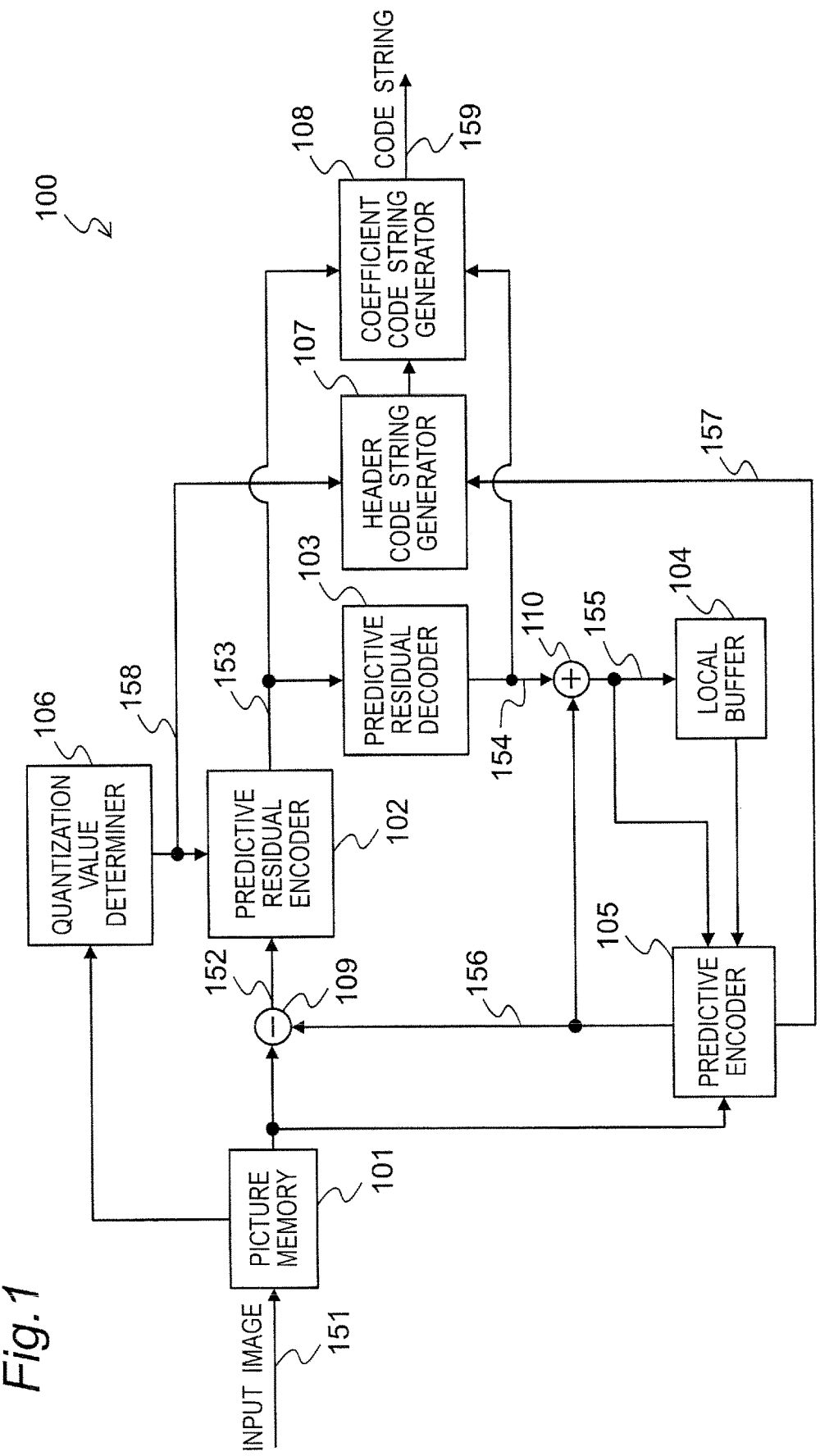
FIG. 1 is a block diagram showing a configuration of a video image encoding device according to a first embodiment.

FIG. 1 is a block diagram showing a configuration of a video image encoding device 100 according to the embodiment. The video image encoding device 100 divides a video image input in units of pictures and performs an encoding process in units of blocks to generate a code string.

The video image encoding device 100 includes a picture memory 101, a predictive residual encoder 102, a predictive residual decoder 103, a local buffer 104, a predictive encoder 105, a quantization value determiner 106, a header code string generator 107, and a coefficient code string generator 108.

The picture memory 101 accumulates input image signals 151 input in units of pictures in a display order an rearranges pictures in an encoding order. When the picture memory 101 accepts a read instruction from a subtracter 109 or the predictive encoder 105, the picture memory 101 outputs an input image signal related to the corresponding instruction. At this time, each picture is divided into encoding units called a coding unit (to be referred to as a CU hereinafter) and each configured by a plurality of pixels. The CU is, for example, a block having 64 (horizontal)×64 (vertical) pixels, a block having 32 (horizontal)×32 (vertical) pixels, a block having 16 (horizontal)×16 (vertical) pixels, or the like. In the video image encoding device 100 in the embodiment, the subsequent processes are performed in units of CUs.

The predictive residual encoder 102 performs orthogonal-transformation a differential image signal 152 output from the subtracter 109. Furthermore, the predictive residual encoder 102 performs quantization of an orthogonal transformation coefficient of each obtained frequency component to compress image information to generate a residual encoding signal 153. The predictive residual encoder 102 outputs the generated residual encoding signal 153 to the predictive residual decoder 103 and the coefficient code string generator 108. At this time, the predictive residual encoder 102 performs quantization of the orthogonal transformation coefficient by using a quantization value signal 158 determined in the quantization value determiner 106.

The predictive residual decoder 103 performs inverse quantization and inverse orthogonal transformation of the residual encoding signal 153 output from the predictive residual encoder 102 to generate a residual decoding signal 154. The generated residual decoding signal 154 is output to an adder 110.

The local buffer 104 stores a reconstructed image signal 155 output from the adder 110. The reconstructed image signal 155 is used in a predicted encoding process in encoding of pictures subsequent to the picture to be encoded at present. More specifically, the reconstructed image signal 155 is referred to as pixel data when the pictures subsequent to the picture to be encoded at present are encoded. The local buffer 104 outputs the stored reconstructed image signal 155 as pixel data to the predictive encoder 105 in response to a read instruction from the predictive encoder 105.

The predictive encoder 105 generates a predicted image signal 156 by using intra prediction or inter prediction based on an input image signal output from the picture memory 101. The predictive encoder 105 outputs the generated predicted image signal 156 to the subtracter 109 and the adder 110. When the inter prediction is used, the predictive encoder 105 uses the reconstructed image signal 155 of a past picture that has been encoded and accumulated in the local buffer 104. When the intra prediction is used, the predictive encoder 105 uses the reconstructed image signal 155 of a current picture of a CU that is adjacent to a CU to be encoded and has been encoded. A mode determining method to select one prediction from intra prediction and inter prediction is performed by predicting a method that can makes an amount of information of a residual signal smaller than that in the other prediction method.

The quantization value determiner 106, based on pictures stored in the picture memory 101, sets a quantization value to be used when the differential image signal 152 is quantized in the predictive residual encoder 102. The quantization value determiner 106 outputs the set quantization value to the predictive residual encoder 102 and the header code string generator 107. As a setting method of a quantization value in the quantization value determiner 106, a quantization value setting method based on so-called rate control in which a quantization value is set to cause a bit rate of a code string signal 159 to be close to a target bit rate may be used.

The header code string generator 107 performs variable-length-coding to a prediction information signal 157 output from the predictive encoder 105, the quantization value signal 158 output from the quantization value determiner 106, and control information related to other encoding control to generate a code string. The prediction information included in the prediction information signal 157 includes, for example, information representing an intra prediction mode, information representing an inter prediction mode, information representing a motion vector, information representing a reference picture, and the like. The control information is information that can be acquired before the process in the coefficient code string generator 108 and information representing an encoding condition applied in encoding of a CU. For example, the information includes a block encoding type, a block division information, and the like.

The coefficient code string generator 108 additionally describes a code string generated by variable-length-coding the residual encoding signal 153 output from the predictive residual encoder 102 or a code string obtained without variable-length-coding the residual decoding signal 154 output from the predictive residual decoder 103 subsequently to a code string generated by the header code string generator 107 to generate the final code string signal 159. The variable-length-coding mentioned here includes arithmetic encoding. The following is the same as the above.

More specifically, the coefficient code string generator 108 executes one mode of two modes are switched depending on an input signal. The first mode is a mode in which the code string signal 159 is generated from a code string obtained by variable-length-coding the residual encoding signal 153 output from the predictive residual encoder 102 and a code string output from the header code string generator 107 and output. The second mode is a mode in which the code string signal 159 is generated from the residual decoding signal 154 output from the predictive residual decoder 103 and a code string output from the header code string generator 107 and output. When the code string signal 159 is output by using the second mode, the residual decoding signal 154 directly handles the residual decoding signal 154 as a code string without variable-length-coding the residual decoding signal 154.

The subtracter 109 generates the differential image signal 152 serving as a difference value between an image signal read from the picture memory 101 and the predicted image signal 156 output from the predictive encoder 105 and outputs the differential image signal 152 to the predictive residual encoder 102.

The adder 110 adds the residual decoding signal 154 output from the predictive residual decoder 103 and the predicted image signal 156 output from the predictive encoder 105 to each other to generate the reconstructed image signal 155 and outputs the reconstructed image signal 155 to the local buffer 104 and the predictive encoder 105.

2. METHOD OF GENERATING CODE STRING SIGNAL

A method of generating a code string signal in the header code string generator 107 and the coefficient code string generator 108 will be concretely described with reference to the flow chart in FIG. 2.

The header code string generator 107 variable-length-codes the prediction information signal 157 generated, the quantization value signal 158, and other encoding control information as a result of the encoding process to generate a code string of header information (S401).

The coefficient code string generator 108 determines, by using the input residual encoding signal 153, whether there is a possibility that an amount of code generated by a CU to be encoded exceeds larger than a predetermined value (S402).

When it is determined that there is no possibility of excess in step S402, an identifier representing that a coefficient is encoded in a Residual mode is encoded (S403). Subsequently, the residual encoding signal 153 input as in conventional encoding is variable-length-coded (Residual mode) to generate a code string (S404).

On the other hand, when it is determined that there is a possibility of excess in step S402, an identifier representing that a coefficient is encoded in a PCM mode is encoded (S405). Subsequently, the input residual decoding signal 154 is directly added to the code string without variable-length-coding the residual decoding signal 154 (S406) to generate a code string (PCM mode).

It is determined by using the input residual encoding signal 153 in step S402 whether there is a possibility that the amount of code generated by the CU to be encoded exceeds the predetermined value. However, it may be determined by using another method whether there is a possibility that the amount of generated code exceeds the predetermined value. For example, there is a method of determining, by using the code string signal 159, whether the amount of code exceeds the predetermined value. In this case, since a code string has been output from coefficient code string generator 108 when the determination is made, in the code string, the process is performed such that the code string obtained by variable-length-coding the residual encoding signal 153 is directly replaced with the input residual decoding signal 154.

In place of determination made in units of CUs, determination may be made in units of sets each configured by a plurality of CUs or in units of other blocks.

3. SYNTAX

FIG. 3 is a diagram showing an example of a syntax :coding_unit( ) in units of CUs in a code string generated by the embodiment.

At the head of the syntax, a code string obtained by variable-length-coding information such as a predictive mode :pred_mode, prediction information :prediction_unit( ) and a quantization value :qp_value, each of which is generated by the header code string generator 107, is described.

Figure 2:
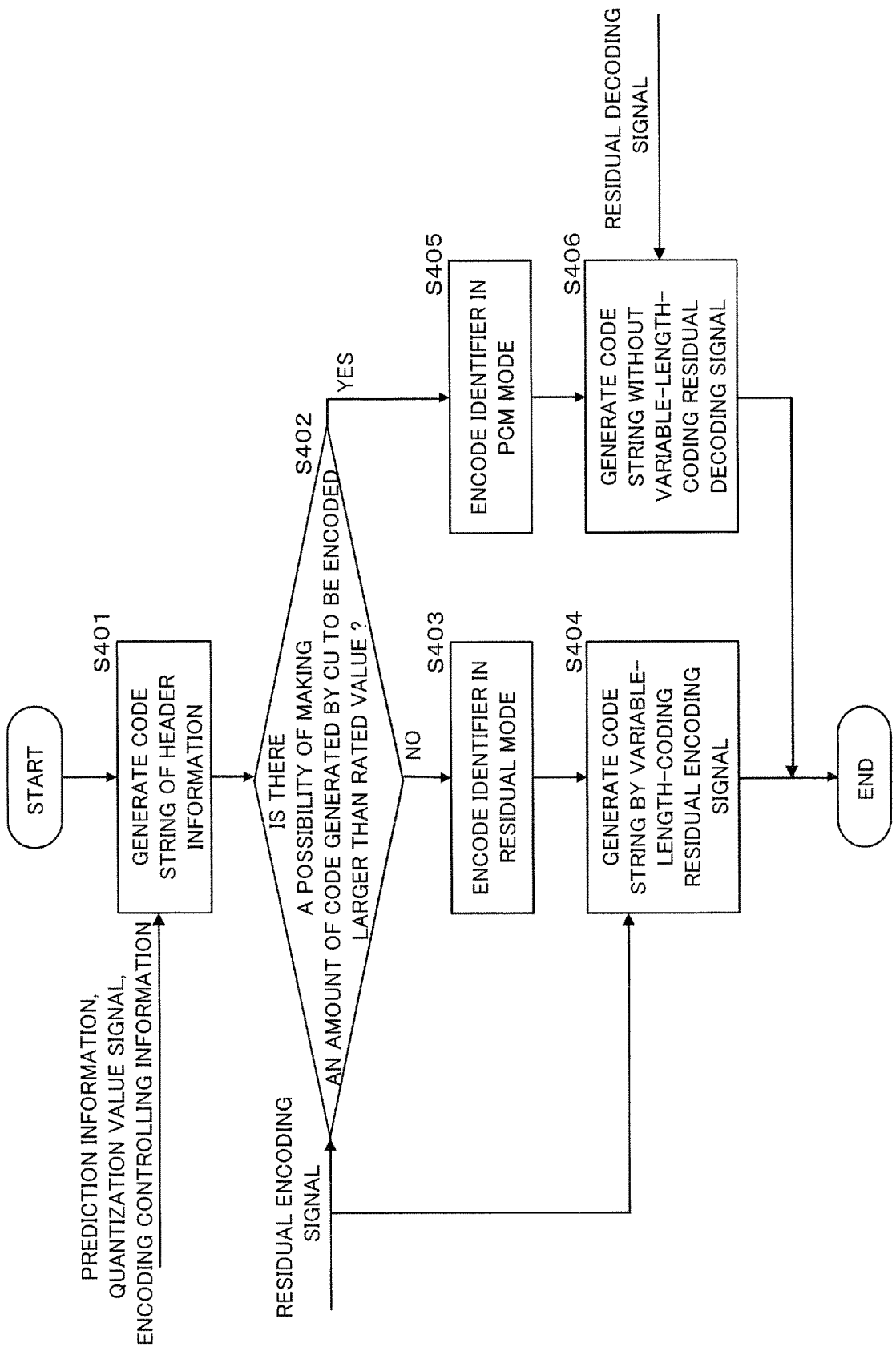
FIG. 2 is a flow chart of a code string generating process according to the first embodiment.

An identifier pcm_flag that is the identifier described in FIG. 2 is described. When the identifier is 0, it means that a coefficient code string is described in Residual_data( ) in a Residual mode. When the identifier is 1, it means that a coefficient code string is described in pcm_data( ) in a PCM mode. A coefficient code string described in pcm_data( ) is, as described above, the residual decoding signal 154 that is not variable-length-coded.

FIG. 4 is a diagram showing another example of a syntax :coding_unit( ) in units of CUs in a code string generated by the embodiment. The syntax is different from the syntax described in FIG. 3 in only that cbp_yuv_root is used as an identifier in place of pcm_flag.

The identifier is used to show whether there are residual encoding signals for each of luminance components and each of color-difference components in conventional encoding. When the identifier ranges from 0 to 7, it means that, as in a conventional technique, a coefficient code string is described in Residual_data( ) in a Residual mode. When the identifier is 8, it means that a coefficient code string is described in pcm_data( ) in the PCM mode. More specifically, 8th information is added to the pieces of conventional information 0 to 7.

In this manner, a new function can be added without increasing an amount of code caused by adding a new identifier.

FIG. 5 is a diagram showing still another example of a syntax :coding_unit( ) in units of CUs in a code string generated by the embodiment. The syntax is different from the syntax described in FIG. 3 in only that residual_data_flag is used as an identifier in place of pcm_flag.

The identifier is used to show whether a target block includes a residual encoding signal in other conventional encoding. More specifically, when the identifier is 0, it means that there is no coefficient information as in a conventional technique. When the identifier is 1, as in a conventional technique, coefficient information represents that the coefficient code string is described in Residual_data( ) in the Residual mode. Furthermore, when the identifier is 2, it means that a coefficient code string is described in pcm_data( ) in the PCM mode.

For this reason, a signal that is present as an identifier in a conventional technique can be used in common to make it possible to suppress an increase of an amount of code caused by adding a new identifier.

The values of the syntaxes and the identifiers described in FIG. 3, FIG. 4, and FIG. 5 are just examples to explain the embodiment. The values of syntaxes and identifiers different from those of the contents described above may be allocated to realize the same functions as described above.

The predetermined value in step S402 in FIG. 2 is an amount of code obtained by adding a margin to an amount of code obtained by summing up an amount of code required when the residual decoding signal 154 is directly described as a code string and a maximum amount of code required when all pieces of information to be described in the header code string are encoded. For example, when the format of an image is YUV4:2:0 in which each pixel has 8 bits and when the size of a CU to be encoded is 32×32 pixels, an amount of code required when the residual decoding signal 154 is directly described as a code string is 1536 bytes. In this case, the predetermined value may be an amount of code obtained by summing the amount of code, a maximum amount of code required when all pieces of information to be described in the header code string are encoded, and a margin. For example, a value of 13000 bits is conceivable.

4. PIPELINE IMPROVING EFFECT

An example of a pipeline in the video image encoding device according to the embodiment will be described with reference to FIGS. 6A and 6B.

Figure 14A:
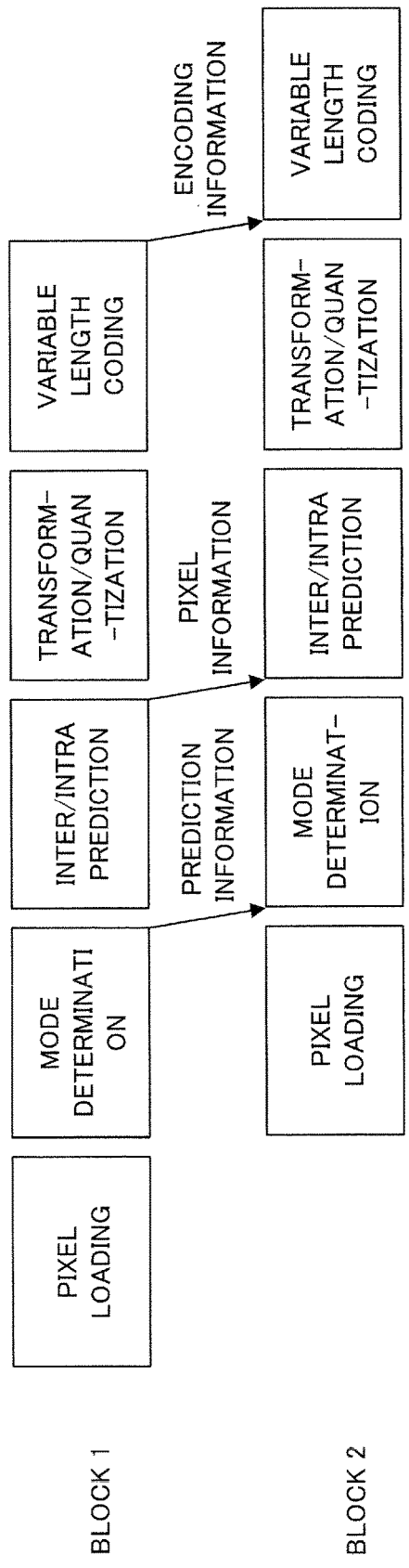
FIGS. 14A and 14B are conceptual diagrams for explaining pipeline control of a conventional video image encoding device.

FIG. 6A is a diagram showing control of a pipeline performed when a coefficient code string is generated in the Residual mode as a result of determination in step S402 in FIG. 2. Processes are performed according to the same flow of the conventional control described in FIG. 14A.

On the other hand, FIG. 6B is a diagram showing pipeline control performed when a coefficient code string is generated in the PCM mode as a result of determination in step S402 in FIG. 2. In the embodiment, as described above, in the first mode, the residual encoding signal 153 generated by the predictive residual encoder 102 is variable-length-coded to generate a coefficient code sting, and, in a state in which header information generated by the header code string generator 107 is associated with the coefficient code string, the coefficient code string and the header information are output. On the other hand, in the second mode, without variable-length-coding the residual decoding signal 154 generated by the predictive residual decoder 103, the residual decoding signal 154 is directly used as a coefficient code string, and, in a state in which header information generated by the header information code string generator 107 is associated with the coefficient code string, the coefficient code string and the header information are output. In this case, the residual decoding signal 154 is based on the input image signal 151 that is the same as the residual encoding signal 153. In the decoding device, when the residual encoding signal 153 is decoded by using prediction information configuring a combination to the signal, the same signal as the residual decoding signal 154 can be obtained. More specifically, pixel information of a reconstructed image finally generated in the decoding device in the first mode is the same as that in the second mode. For this reason, even when the mode of a block 1 is switched to the PCM mode, a change of prediction information described in the header code string and re-encoding are not necessary. For this reason, a process in a block 2 in which an encoding process proceeds with reference to prediction information and pixel information of the block 1 is not influenced at all. Thus, only a coefficient code string can be directly encoded in the PCM mode without retracing the pipeline.

When the residual decoding signal 154 is output, the signal does not need to be decoded in the decoding device. For this reason, although prediction information is not required to decode the signal, the prediction information is referred to in decoding or the like in the block 2.

In this manner, in the video image encoding device according to the embodiment, encoding can be performed by switching the mode to the PCM mode without retracing the pipeline, an amount of generated code in units of blocks can be made equal to or smaller than a specific maximum value without decreasing a processing speed or increasing an amount of processing.

5. CONCLUSION

The video image encoding device 100 according to the embodiment is the video image encoding device 100 that encodes an input video image in units of blocks, and includes the predictive encoder 105 that generates a predictive image corresponding to an image to be encoded, the subtracter 109 that generates the differential image signal 152 between the image to be encoded and the generated predictive image, the predictive residual encoder 102 that performs an orthogonal transformation process and a quantizing process to an output from the subtracter 109 to generate the residual encoding signal 153, the predictive residual decoder 103 that performs an inverse quantizing process and an inverse orthogonal transformation process to the residual encoding signal 153 to generate the residual decoding signal 154, the adder 110 that adds the predictive image generated by the predictive encoder 105 and the residual decoding signal 154 generated by the predictive residual decoder 103 to each other to generate the reconstructed image signal 155, the header code string generator 107 that generates header information including at least prediction information used in generating the predictive image, and the coefficient code string generator 108 that, in the first mode, variable-length-codes the residual encoding signal 153 generated by the predictive residual encoder 102 to generate a coefficient code string, outputs the coefficient code string and the header information in a state in which the header information generated by the header code string generator is associated with the coefficient code string, in the second mode, directly uses the residual decoding signal 154 as a coefficient code string without variable-length-coding the residual decoding signal 154 generated by the predictive residual decoder 103, and outputs the coefficient code string and the header information in a state in which the header information generated by the header code string generator is associated with the coefficient code string.

More preferably, the coefficient code string generator 108 outputs the coefficient code string, the header information, and the identifier in a state in which an identifier representing whether inverse quantization and inverse orthogonal transformation are performed when the coefficient code string is decoded is associated with the coefficient code string and the header information.

More preferably, the identifier is an identifier that is shared by the coefficient code string in the first mode and the coefficient code string in the second mode, one of the pieces of identifier information represents that encoding is performed as a coefficient code string in the first mode, and the other represents that encoding is performed as a coefficient code string in the second mode and represents whether the residual encoding signal 153 is encoded or not.

Second Embodiment

A video image encoding device according to the second embodiment will be described below with reference to the accompanying drawings.

1. CONFIGURATION OF VIDEO IMAGE ENCODING DEVICE

Figure 7:
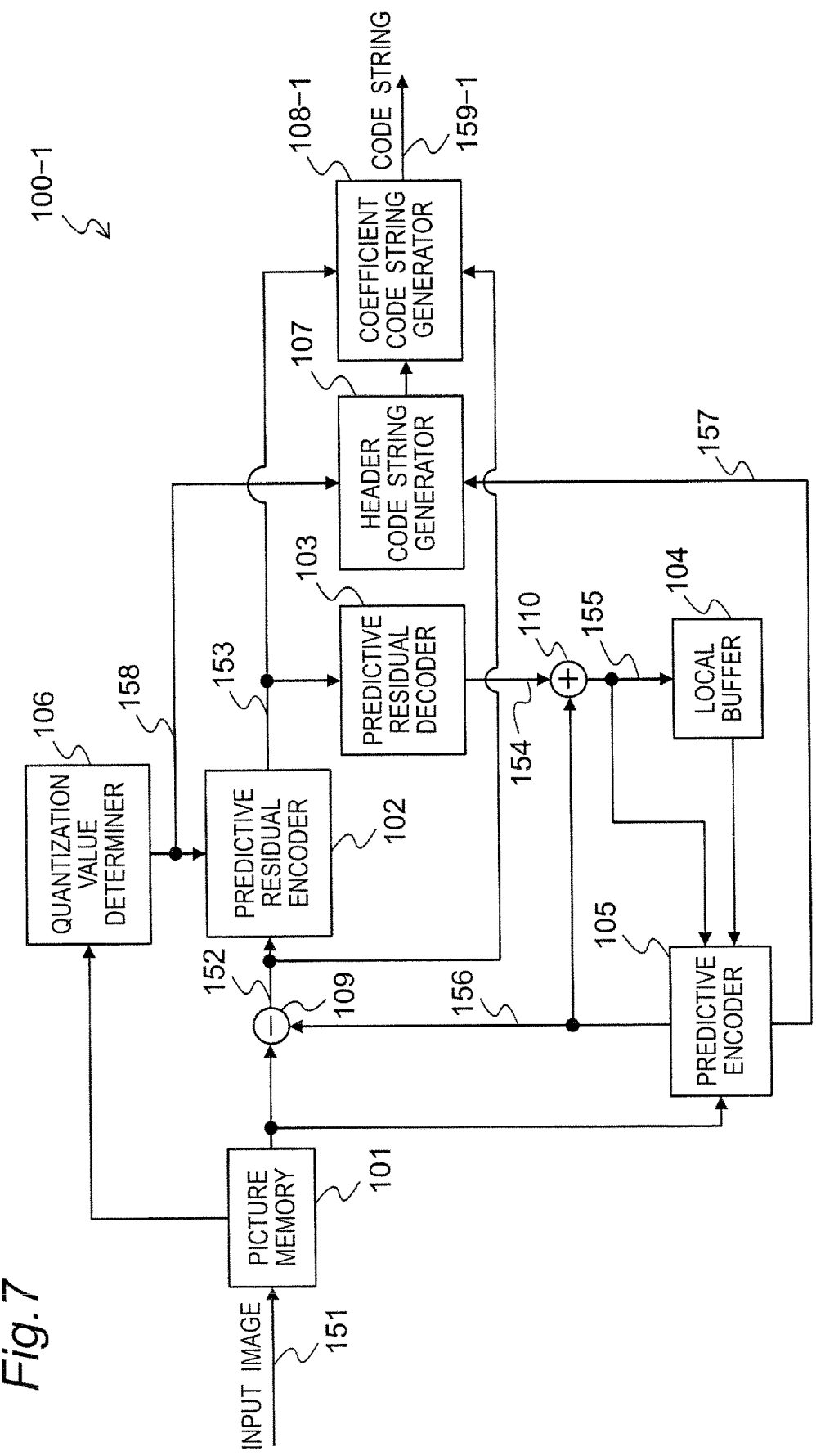
FIG. 7 is a block diagram showing a configuration of a video image encoding device according to a second embodiment.

FIG. 7 is a block diagram showing a video image encoding device 100-1 according to the embodiment. The video image encoding device 100-1 divides a video image input in units of pictures into blocks and performs an encoding process in units of blocks to generate a code string.

The video image encoding device 100-1 includes a coefficient code string generator 108-1 in place of the coefficient code string generator 108 of the video image encoding device 100 in the first embodiment.

For descriptive convenience, the detailed description of the same configurations as in the first embodiment will be omitted. Furthermore, in FIG. 7, the same numbers as in FIG. 1 denote blocks having the same functions as in FIG. 1.

The coefficient code string generator 108-1 has a first mode in which a code string obtained by variable-length-coding the residual encoding signal 153 output from the predictive residual encoder 102 is additionally described subsequently to a code string generated by the header code string generator 107 to generate a final code string signal 159-1. Furthermore, the coefficient code string generator 108-1 has a second mode in which a code string obtained without variable-length-coding the differential image signal 152 output from the subtracter 109 is additionally described subsequently to a code string generated by the header code string generator 107 to generate the final code string signal 159-1.

The second mode may be a mode in which a code string obtained by variable-length-coding the differential image signal 152 output from the subtracter 109 is additionally described subsequently to a code string generated by the header code string generator 107 to generate the final code string signal 159-1.

The coefficient code string generator 108-1 executes the operations while switching the first mode and the second mode.

2. METHOD OF GENERATING CODE STRING

Figure 8:
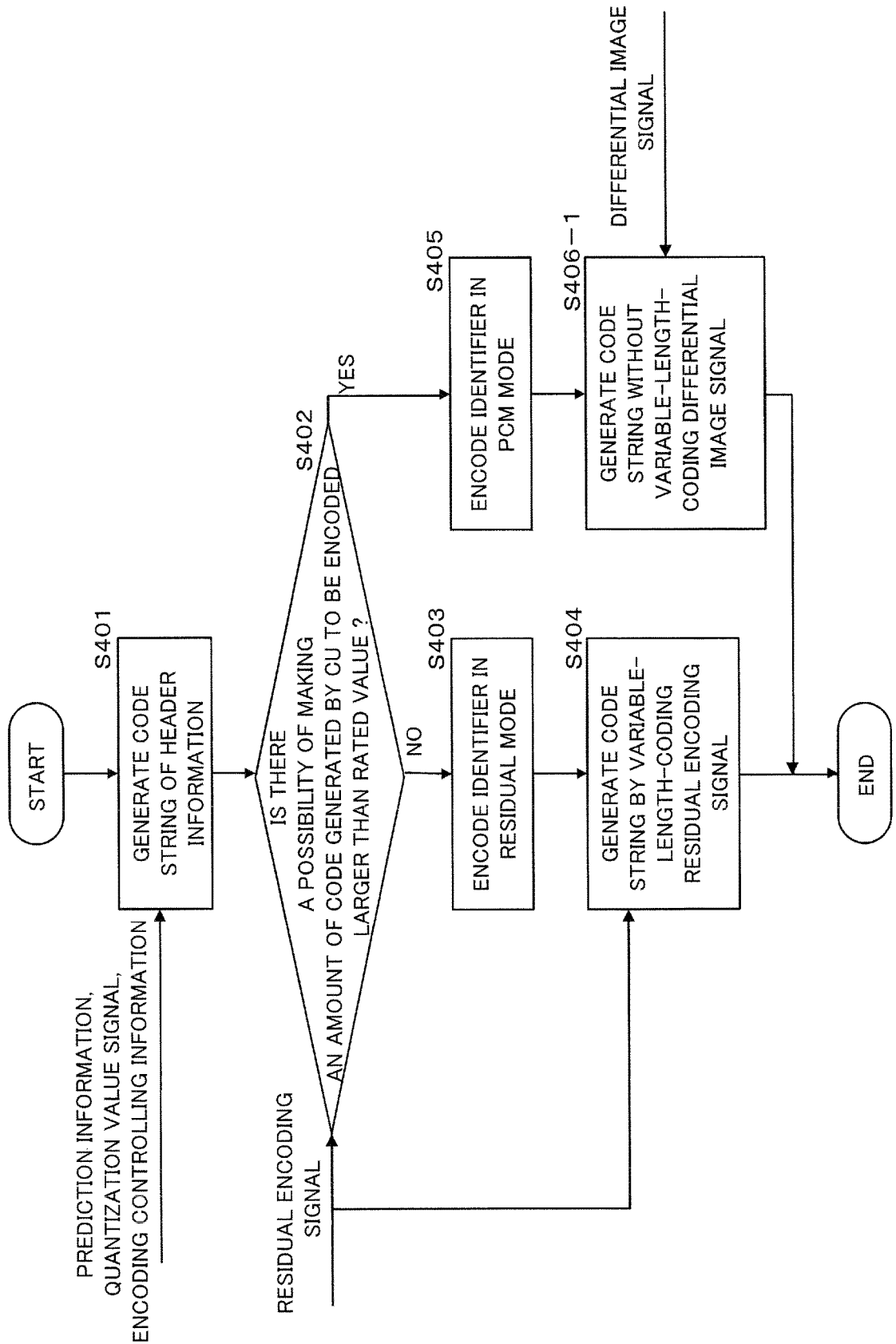
FIG. 8 is a flow chart of a code string generating process according to the second embodiment.

FIG. 8 is a flow chart showing a method of generating a code string signal in the header code string generator 107 and the coefficient code string generator 108-1.

In this flow chart, the process in step S406-1 is performed in place of the process in step S406 in the flow chart in FIG. 2 in the first embodiment.

More specifically, when it is determined in step S402 that an amount of code generated in a CU to be encoded may exceed a predetermined value, an identifier representing that a coefficient is encoded in the PCM mode is encoded (S405). Subsequently, the input differential image signal 152 is directly added to the code string without being variable-length-coded (PCM mode) to generate a code string (S406-1). In the above description, the differential image signal 152 may be configured to be variable-length-coded and output.

3. SYNTAX

A syntax in the embodiment and an identifier encoded in S405 are the same as those in the first embodiment.

The predetermined value in step S402 in FIG. 8 is an amount of code obtained by adding a margin to an amount of code obtained by summing up an amount of code required when a differential image (pixel value of the differential image signal 152) is directly described as a code string and a maximum amount of code required when all pieces of information to be described in the header code string are encoded. For example, when the format of an image is YUV4:2:0 in which each pixel has 8 bits and when the size of a CU to be encoded is 32×32 pixels, an amount of code required when the pixel value of the differential image signal 152 is directly described as a code string is 1536 bytes. An amount of code obtained by summing up the amount of code described above and the maximum amount of code required when all pieces of information to be described in the header code string are encoded is added with a margin, so that a value of 13000 bits or the like is conceivable as the predetermined value.

4. PIPELINE IMPROVING EFFECT

An example of a pipeline in the video image encoding device according to the embodiment will be described with reference to FIGS. 9A and 9B.

FIG. 9A is a diagram showing control of a pipeline performed when a coefficient code string is generated in the Residual mode as a result of determination in step S402 in FIG. 8. Processes are performed according to the same flow of the conventional control described in FIG. 14A.

Figure 14B:
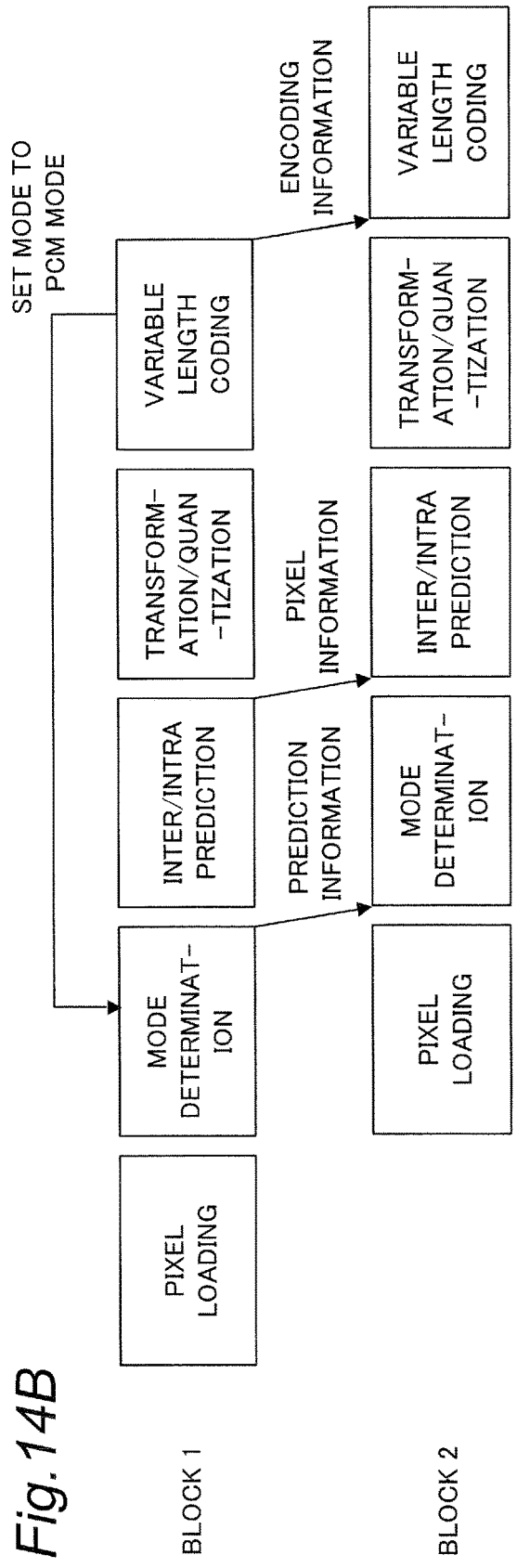

On the other hand, FIG. 9B is a diagram showing control of a pipeline performed when a coefficient code string is generated in the PCM mode as a result of determination in step S402 in FIG. 8. In the embodiment, as described above, in the first mode, a code string obtained by variable-length-coding the residual encoding signal 153 output from the predictive residual encoder 102 is additionally described subsequently to a code string generated by the header code string generator 107 to generate the final code string signal 159-1. On the other hand, in the second mode, a code string obtained without variable-length-coding the differential image signal 152 output from the subtracter 109 is additionally described subsequently to a code string generated by the header code string generator 107 to generate the final code string signal 159-1. In this case, the residual encoding signal 153 is based on the input image signal 151 that is the same as the differential image signal 152. For this reason, even though a block 1 is switched to the PCM mode, a change of prediction information described in the header code string is unnecessary. However, in the decoding device, when the residual encoding signal 153 is decoded by using prediction information configuring a combination to the signal, a signal different from the differential image signal 152 is generated. For this reason, pixel information of a reconstructed image signal finally obtained in the decoding device when encoding is performed in the first mode is different from that obtained when encoding is performed in the second mode. At this time, an encoding process of block 2 that refers to pixel information of the block 1 proceeds. For this reason, even in a block 2, the process must be executed again such that the pixel information is replaced. Thus, the process must retrace an inter/intra prediction process in the block 1. However, in comparison with the conventional control described in FIG. 14B, the number of processes to retrace decreases.

In this manner, the video image encoding device according to the embodiment can make an amount of processing to retrace the pipeline smaller than that in a conventional technique. For this reason, an amount of code generated in units of blocks can be suppressed in an amount equal to or smaller than a specific maximum value while suppressing a decrease in processing speed or an increase in an amount of processing.

In the embodiment, a differential image obtained before an encoding process is encoded. For this reason, the quality of an image decided in the corresponding video image decoding device can be improved.

5. CONCLUSION

The video image encoding device according to the embodiment is the video image encoding device 100-1 that encodes an input video image in units of blocks, and includes the predictive encoder 105 that generates a predictive image corresponding to an image to be encoded, the subtracter 109 that generates the differential image signal 152 between the image to be encoded and the generated predictive image, the predictive residual encoder 102 that performs an orthogonal transformation process and a quantizing process to an output from the subtracter 109 to generate the residual encoding signal 153, the predictive residual decoder 103 that performs an inverse quantizing process and an inverse orthogonal transformation process to the residual encoding signal 153 to generate the residual decoding signal 154, the adder 110 that adds the predictive image generated by the predictive encoder 105 and the residual decoding signal 154 generated by the predictive residual decoder 103 to each other to generate the reconstructed image signal 155, the header code string generator 107 that generates header information including at least prediction information used in generating the predictive image, and the coefficient code string generator 108-1 that, in the first mode, variable-length-codes the residual encoding signal 153 generated by the predictive residual encoder 102 to generate a coefficient code string, outputs the coefficient code string and the header information in a state in which the header information generated by the header code string generator is associated with the coefficient code string, in the second mode, directly uses the differential image signal 152 as a coefficient code string without variable-length-coding the differential image signal 152 generated by the subtracter 109, and outputs the coefficient code string and the header information in a state in which the header information generated by the header code string generator is associated with the coefficient code string.

The video image encoding device according to the embodiment is the video image encoding device 100-1 that encodes an input video image in units of blocks, and includes the predictive encoder 105 that generates a predictive image corresponding to an image to be encoded, the subtracter 109 that generates the differential image signal 152 between the image to be encoded and the generated predictive image, the predictive residual encoder 102 that performs an orthogonal transformation process and a quantizing process to an output from the subtracter 109 to generate the residual encoding signal 153, the predictive residual decoder 103 that performs an inverse quantizing process and an inverse orthogonal transformation process to the residual encoding signal 153 to generate the residual decoding signal 154, the adder 110 that adds the predictive image generated by the predictive encoder 105 and the residual decoding signal 154 generated by the predictive residual decoder 103 to each other to generate the reconstructed image signal 155, the header code string generator 107 that generates header information including at least prediction information used in generating the predictive image, and the coefficient code string generator 108-1 that, in the first mode, variable-length-codes the residual encoding signal 153 generated by the predictive residual encoder 102 to generate a coefficient code string, outputs the coefficient code string and the header information in a state in which the header information generated by the header code string generator is associated with the coefficient code string, in the second mode, directly uses the differential image signal 152 as a coefficient code string while variable-length-coding the differential image signal 152 generated by the subtracter 109, and outputs the coefficient code string and the header information in a state in which the header information generated by the header code string generator is associated with the coefficient code string.

More preferably, the coefficient code string generator 108-1 outputs the coefficient code string, the header information, and the identifier in a state in which an identifier representing whether inverse quantization and inverse orthogonal transformation are performed when the coefficient code string is decoded is associated with the coefficient code string and the header information.

More preferably, the identifier is an identifier that is shared by the coefficient code string in the first mode and the coefficient code string in the second mode, one of the pieces of identifier information represents that encoding is performed as a coefficient code string in the first mode, and the other represents that encoding is performed as a coefficient code string in the second mode and represents that there is the encoded residual encoding signal 153 is encoded.

Third Embodiment

A video image encoding device according to a third embodiment will be described below with reference to the accompanying drawings.

1. CONFIGURATION OF VIDEO IMAGE ENCODING DEVICE

Figure 10:
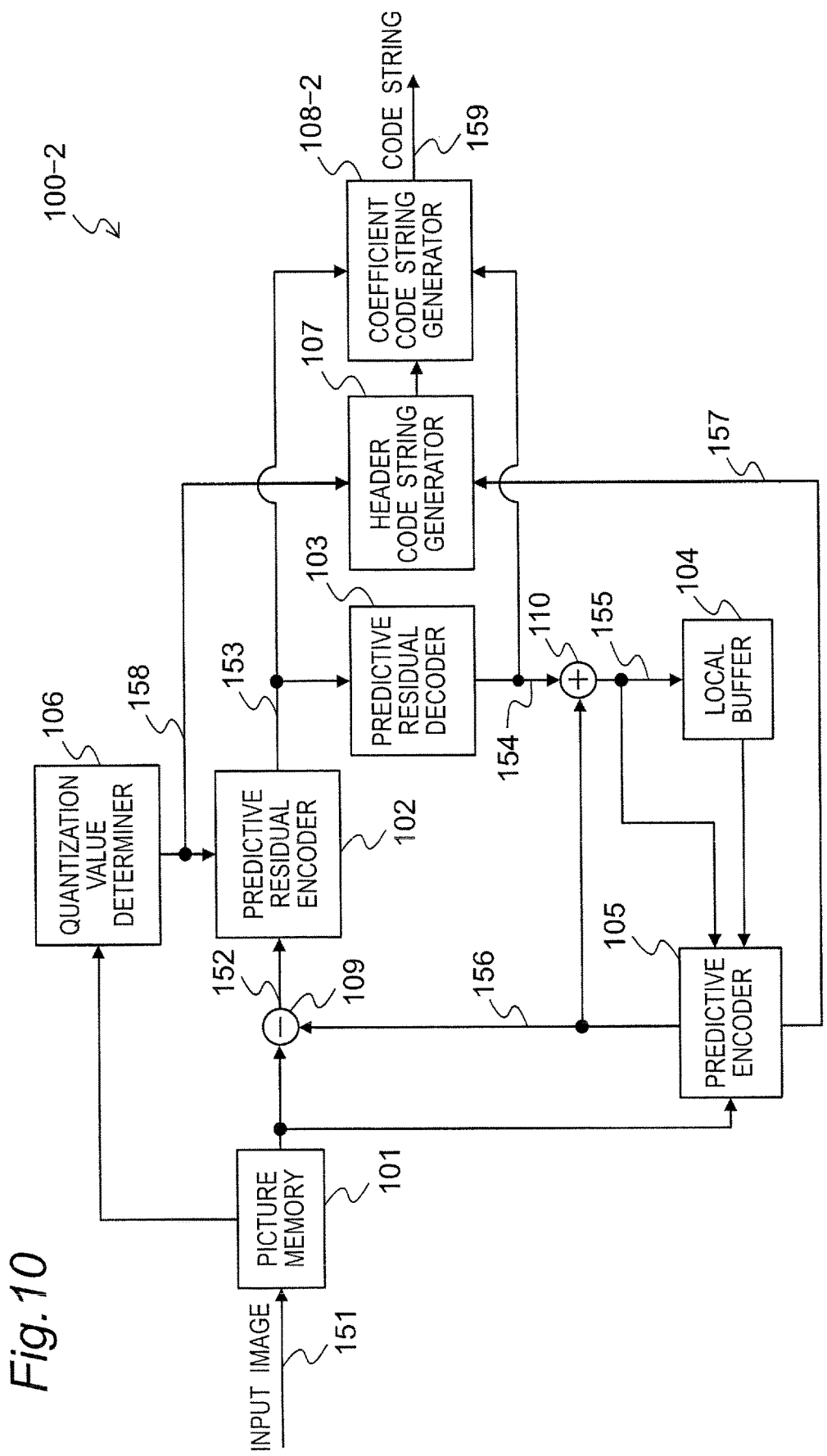
FIG. 10 is a block diagram showing a configuration of a video image encoding device according to a third embodiment.

FIG. 10 is a block diagram showing a video image encoding device 100-2 according to the embodiment. The video image encoding device 100-2 divides a video image input in units of pictures and performs an encoding process in units of blocks to generate a code string.

The video image encoding device 100-2 includes a coefficient code string generator 108-2 in place of the coefficient code string generator 108 of the video image encoding device 100 in the first embodiment.

For descriptive convenience, the detailed description of the same configurations as in the first embodiment will be omitted. Furthermore, in FIG. 10, the same numbers as in FIGS. 1 and 7 denote blocks having the same functions as in FIGS. 1 and 7.

The coefficient code string generator 108-2 executes the operations such that two modes are switched depending on an input signal. A first mode is a mode in which a code string obtained by variable-length-coding the residual encoding signal 153 output from the predictive residual encoder 102 is additionally described subsequently to a code string generated by the header code string generator 107 to generate a final code string signal 159-2. A second mode is a mode in which a code string obtained without variable-length-coding a code string obtained by multiplying each coefficient of the residual decoding signal 154 by 1/N (N is a natural number) is additionally described subsequently to a code string generated by the header code string generator 107 to generate the final code string signal 159-2.

2. METHOD OF GENERATING CODE STRING

Figure 11:
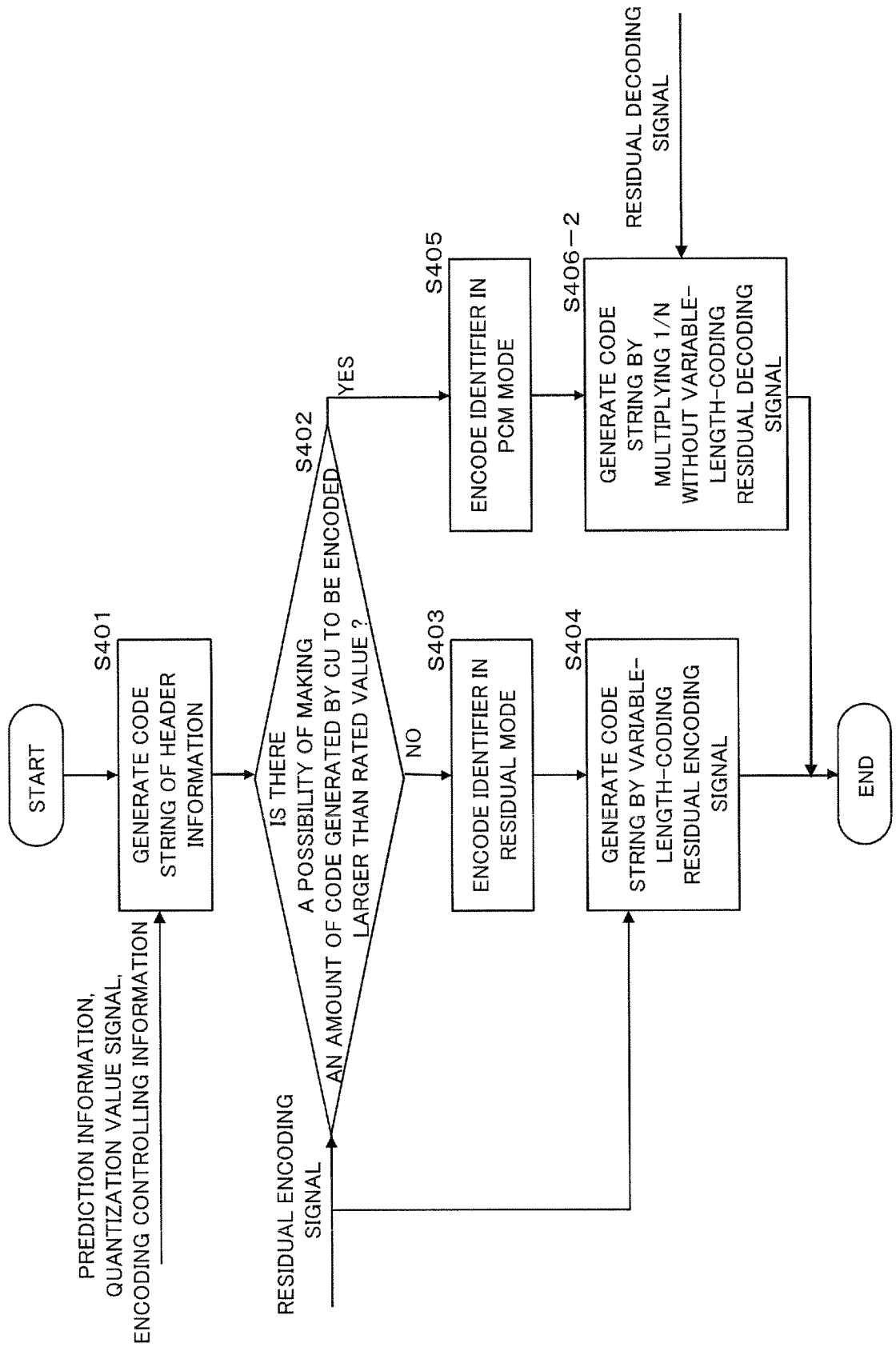
FIG. 11 is a flow chart of a code string generating process according to the third embodiment.

FIG. 11 is a flow chart showing a method of generating a code string signal in the header code string generator 107 and the coefficient code string generator 108-2.

This flow chart is different from the flow chart in FIG. 2 in the first embodiment in only that the process in step S406-2 is performed in place of the process in step S406 in the flow chart in FIG. 2.

More specifically, when it is determined in step S402 that an amount of code generated in a CU to be encoded may exceed a predetermined value, an identifier representing that a coefficient is encoded in the PCM mode is encoded (S405). Subsequently, each coefficient of the input residual decoding signal 154 is multiplied by 1/N and added to a code string without being variable-length-coded (PCM mode) to generate a code string (S406-2).

3. SYNTAX

A syntax in the embodiment and an identifier encoded in S405 are the same as those in the first embodiment.

4. PIPELINE IMPROVING EFFECT

An example of a pipeline in the video image encoding device according to the embodiment is almost the same as those in FIGS. 9A and 9B, and different points will be described below.

When the PCM mode is selected as a result of determination in step S402 in FIG. 8, a residual decoded image is multiplied by 1/N. However, the residual decoded image must be multiplied by N in decoding to generate a residual decoded image. For this reason, an error occurs in the range of $\pm(N-1)$.

FIG. 9B is a diagram showing a pipeline control performed when a coefficient code string is generated in the PCM mode as a result of determination in step S402 in FIG. 8. When a block 1 is switched to the PCM mode, the prediction information described in the header code string is not changed. However, the residual decoded image changes. For this reason, an encoding process in a block 2 that refers to pixel information of the block 1 proceeds. As a result, the process must be performed again after the pixel information is replaced. Thus, the process must retrace an inter/intra prediction process in the block 1. However, in comparison with the conventional control described in FIG. 14B, the number of processes decreases.

In this manner, the video image encoding device according to the embodiment can make an amount of processing to retrace the pipeline smaller than that in a conventional technique. For this reason, an amount of code generated in units of blocks can be suppressed in an amount equal to or smaller than a specific maximum value while suppressing a decrease in processing speed or an increase in an amount of processing.

In the embodiment, the residual decoded image is multiplied by 1/N. For this reason, the number of bits can be reduced.

When a value N is fixed, the value N does not need to be described on the syntax. When the value N is to be described on the syntax, the value may be described ins fields to which one value for each picture is described.

5. CONCLUSION

The coefficient code string generator 108-2 according to the embodiment, in the first mode, variable-length-codes the residual encoding signal 153 to generate a first coefficient code string, and, in the second mode, sets the differential decoded image multiplied by 1/N (N is a natural number) as a second coefficient code string.

The coefficient code string generator 108-2 according to the embodiment, in the first mode, variable-length-codes the residual encoding signal 153 to generate the first coefficient code string, and, in the second mode, sets the differential image signal 152 multiplied by 1/N (N is a natural number) as the second coefficient code string.

Fourth Embodiment

A video image decoding device according to a fourth embodiment will be described below with reference to the accompanying drawings.

1. CONFIGURATION OF VIDEO IMAGE DECODING DEVICE

Figure 12:
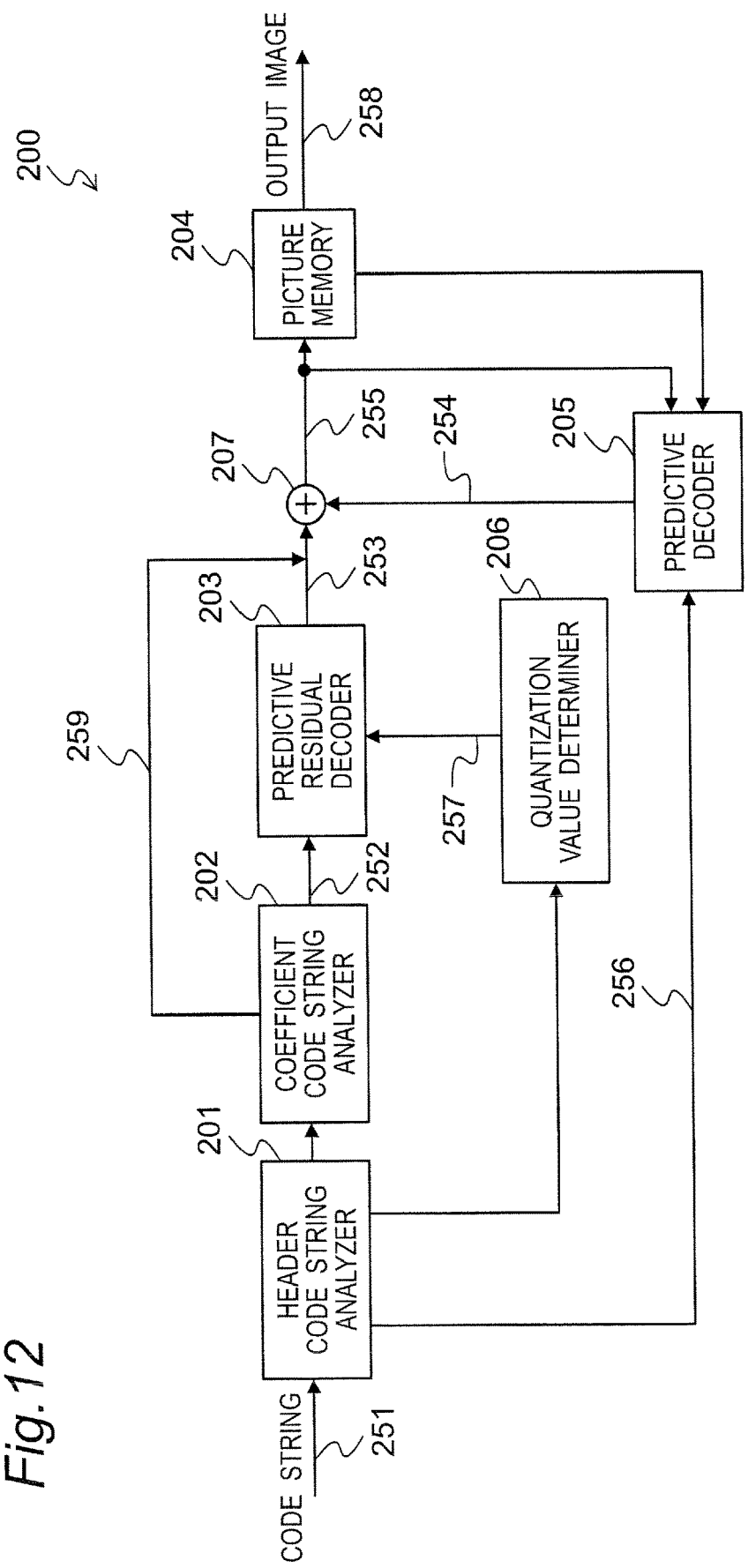
FIG. 12 is a block diagram showing a configuration of a video image decoding device according to a fourth embodiment.

FIG. 12 is a block diagram showing a configuration of a video image decoding device 200 according to the fourth embodiment. The video image decoding device 200 performs a decoding process to a code string generated by the video image encoding device described in the second embodiment in units of blocks called coding units (CU) to generate an output image.

The video image decoding device 200 includes a header code string analyzer 201, a coefficient code string analyzer 202, a predictive residual decoder 203, a picture memory 204, a predictive decoder 205, and a quantization value determiner 206.

The header code string analyzer 201 performs variable length decoding to a header area of an input code string signal 251 in units of blocks to analyze header information. The header code string analyzer 201 outputs a prediction information signal 256 obtained by analysis to the predictive decoder 205. Furthermore, the header code string analyzer 201 outputs quantization value information obtained by analysis to the quantization value determiner 206.

The coefficient code string analyzer 202 analyzes a coefficient code string encoded subsequently to the header information analyzed by the header code string analyzer 201. At this time, when the coefficient code string is a residual encoding signal 252 as a result of analysis, the coefficient code string analyzer 202 outputs the residual encoding signal 252 to the predictive residual decoder 203. On the other hand, when the coefficient code string is a differential image signal 259 as a result of analysis, the coefficient code string analyzer 202 outputs the differential image signal 259 to an adder 207 while bypassing the predictive residual decoder 203. More specifically, when the coefficient code string is the differential image signal 259, a generating process of a residual decoding signal 253 by the predictive residual decoder 203 is not executed. When the coefficient code string is variable-length-coded, the coefficient code string analyzer variable-length-decodes the coefficient code string and then outputs the decoded coefficient code string as the residual encoding signal 252 or the differential image signal 259. On the other hand, when the variable-length-coding is not performed, the coefficient code string analyzer outputs the coefficient code string as the residual encoding signal 252 or the differential image signal 259 without variable-length-decoding the coefficient code string.

The predictive residual decoder 203 performs inverse quantization and inverse orthogonal transformation the residual encoding signal 252 input from the coefficient code string analyzer 202 to generate the residual decoding signal 253. The predictive residual decoder 203 outputs the generated residual decoding signal 253 to the adder 207. At this time, the predictive residual decoder 203 controls inverse quantization by using a quantization value signal 257 determined in the quantization value determiner 206.

The predictive decoder 205 generates a predictive image signal 254 by using intra prediction or inter prediction based on the prediction information signal 256 output from the header code string analyzer 201. The predictive decoder 205 outputs the generated predictive image signal 254 to the adder 207. The predictive decoder 205, in use of the inter prediction, uses a reconstructed image signal 255 of a past picture that is accumulated in the picture memory 204 and has been decoded. The predictive decoder 205, in use of the intra prediction, uses the reconstructed image signal 255 of a current picture of a CU that is adjacent to a CU to be decoded and has been decoded. It is determined according to the input prediction information signal 256 whether the intra prediction or the inter prediction is used.

The adder 207 adds the predictive image signal 254 output from the predictive decoder 205 to the residual decoding signal 253 output from the predictive residual decoder 203 or the differential image signal 259 output from the coefficient code string analyzer 202 to generate the reconstructed image signal 255. The generated reconstructed image signal 255 is stored in the picture memory 204 and is finally output to the display device as an output image signal 258 in units of pictures.

2. METHOD OF ANALYZING CODE STRING

Figure 13:
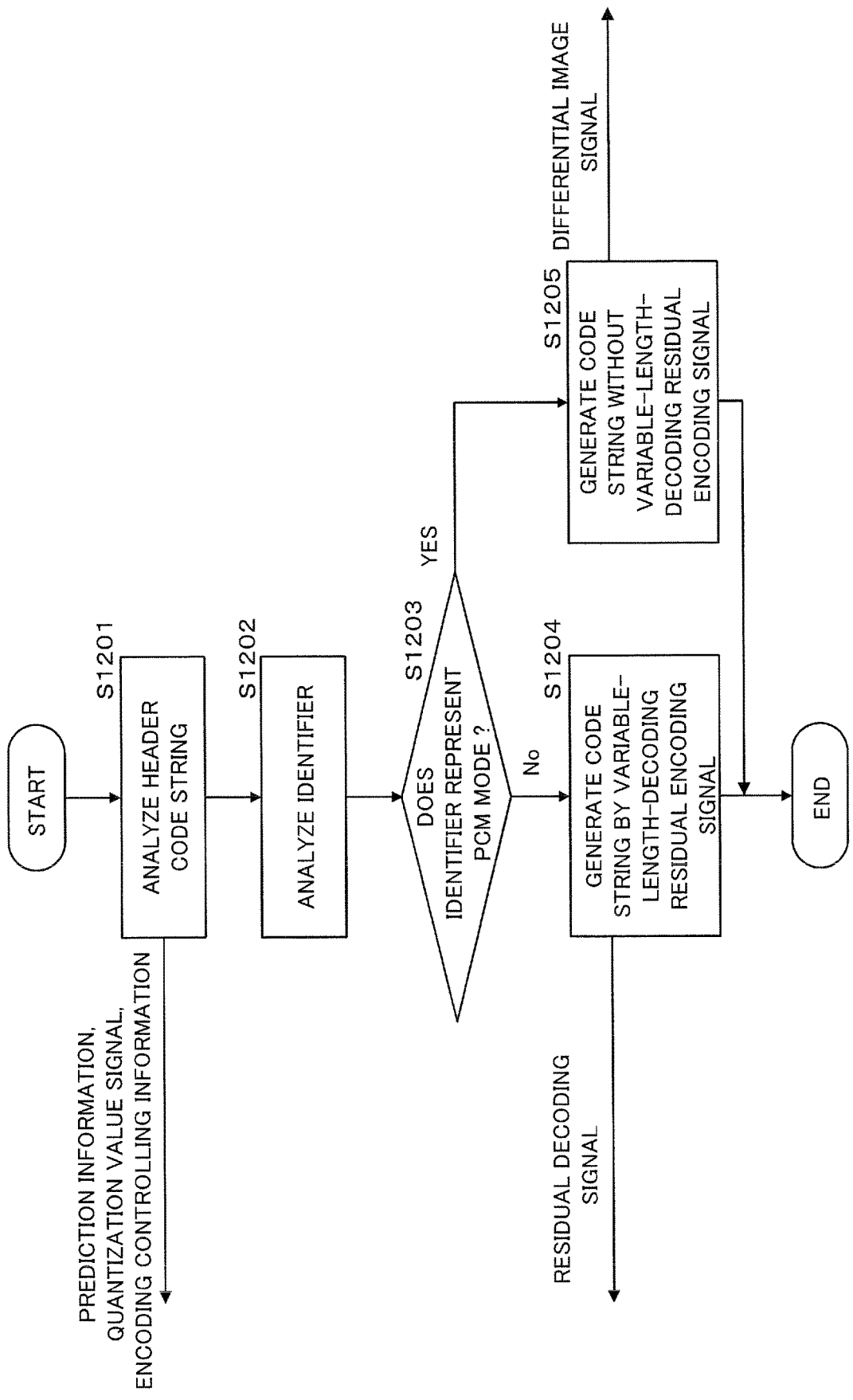
FIG. 13 is a flow chart of a code string analyzing process according to the fourth embodiment.

A method of analyzing a code string in the header code string analyzer 201 and the coefficient code string analyzer 202 will be concretely described with reference to the flow chart in FIG. 13.

The header code string analyzer 201 performs variable length decoding to a header area of an input code string to analyze header information to output the generated prediction information signal 256, quantization value information, and other decoding control information to the process blocks in FIG. 12 (S1201).

The coefficient code string analyzer 202 analyzes an identifier in step S1202 and, in step S1203, determines whether the analyzed identifier represents that a coefficient is encoded in the PCM mode or a coefficient is encoded in the Residual mode.

In step S1203, when it is determined that the coefficient is encoded in the Residual mode, variable length decoding is performed to a coefficient code string input by the same manner as that in a conventional technique to acquire the residual encoding signal 252 and outputs the residual encoding signal 252 to the predictive residual decoder 203 (S1204).

On the other hand, in step S1203, when it is determined that a coefficient is encoded in the PCM mode, the input coefficient code string is directly replaced, as the differential image signal 259, with the residual decoding signal 253 output from the predictive residual decoder 203 without being variable-length-decoded to perform the subsequent processes (S1205).

The processing method for a code string generated in the video image encoding device 100-1 described in the second embodiment is described here. However, by the same processing method, a code string generated by the video image encoding device 100 described in the first embodiment can also be decoded. At this time, information acquired in step S1205 is replaced with a residual decoding signal 252 obtained after the residual decoding in the corresponding encoding device. However, the process can be performed without discriminating the decoding processes from each other.

A code string generated by the video image encoding device 100-2 described in the third embodiment can be decoded by the same processing method described above without changing processes except for the process in which a signal obtained by multiplying coefficients of the residual decoding signal 252 by N in the coefficient code string analyzer 202 in step S1205 is output as the residual decoding signal 252.

3. SYNTAX

A syntax of a code string subjected to a decoding process in the embodiment and an identifier analyzed in S1202 are the same as those in the first embodiment.

4. PIPELINE IMPROVING EFFECT

By using the video image decoding device according to the embodiment, the video image encoding device that generates a code string corresponding to the video image decoding device can employ the configuration described in the first embodiment, and encoding can be performed such that the mode is switched to the PCM mode without retracing the pipeline as in FIG. 6B. For this reason, an amount of code generated in units of blocks can be suppressed in an amount equal to or smaller than a specific maximum value without decreasing a processing speed or increasing an amount of processing.

Similarly, by using the video image decoding device according to the embodiment, the video image encoding device that generates a code string corresponding to the video image decoding device can employ the configuration described in the second embodiment or the third embodiment to make it possible to make an amount of processing to retrace the pipeline smaller than that in a conventional technique as shown in FIG. 9B. For this reason, an amount of code generated in units of blocks can be suppressed in an amount equal to or smaller than a specific maximum value while suppressing a decrease in processing speed or an increase in an amount of processing, and the quality of the decoded image can be improved.

5. CONCLUSION

The video image decoding device 200 according to the embodiment is the video image decoding device 200 that decodes a code string to be decoded in units of blocks, includes the header code string analyzer 201 that accepts a first code string to be decoded including information based on an encoded residual coefficient and header information associated with the information or a second code string to be decoded including a residual image obtained in an encoding process step of the code string to be decoded and header information associated with the residual image as the code string to be decoded, the header code string analyzer 201 that acquires at least the prediction information serving as information related to a predictive image used in generating the code string to be decoded from the header information, the coefficient code string analyzer 202 that variable-length-decodes the code string to be decoded accepted by the header code string analyzer 201 to output a residual coefficient, the predictive residual decoder 203 that performs inverse quantization and inverse orthogonal transformation to the residual coefficient output from the coefficient code string analyzer 202 to generate a residual decoded image, the predictive decoder 205 that generates a predictive image corresponding to the code string to be decoded based on the prediction information acquired by the header code string analyzer 201, and the adder 207 that, when the code string to be decoded accepted by the header code string analyzer 201 is the first code string to be decoded, adds the residual decoded image generated by the predictive residual decoder 203 and the predictive image generated by the predictive decoder 205 to each other to generate and output a reconstructed image and, when the code string to be decoded accepted by the header code string analyzer 201 is the second code string to be decoded, adds a residual image included in the second code string to be decoded and the predictive image generated by the predictive decoder 205 to each other to generate and output a reconstructed image.

The video image decoding device 200 according to the embodiment is the video image decoding device 200 that decodes a code string to be decoded in units of blocks, and includes the header code string analyzer 201 that accepts a first code string to be decoded including information and header information associated with the information based on an encoded residual coefficient or a second code string to be decoded including a residual decoded image obtained by locally decoding a residual coefficient obtained in an encoding process step of the code string to be decoded and header information associated with the residual decoded image as the code string to be decoded, the header code string analyzer 201 that acquires at least the prediction information serving as information related to a predictive image used in generating the code string to be decoded from the header information, the coefficient code string analyzer 202 that variable-length-decodes the code string to be decoded accepted by the header code string analyzer 201 to output a residual coefficient, the predictive residual decoder 203 that performs inverse quantization and inverse orthogonal transformation to the residual coefficient output from the coefficient code string analyzer 202 to generate a residual decoded image, the predictive decoder 205 that generates a predictive image corresponding to the code string to be decoded based on the prediction information acquired by the header code string analyzer 201, and the adder 207 that, when the code string to be decoded accepted by the header code string analyzer 201 is the first code string to be decoded, adds the residual decoded image generated by the predictive residual decoder 203 and the predictive image generated by the predictive decoder 205 to each other to generate and output a reconstructed image and, when the code string to be decoded accepted by the header code string analyzer 201 is the second code string to be decoded, adds a residual decoded image included in the second code string to be decoded and the predictive image generated by the predictive decoder 205 to each other to generate and output a reconstructed image.

The code string to be decoded preferably includes an identifier representing whether a residual image obtained in the encoding process step of the code string to be decoded is included in the code string to be decoded, the adder 207, when the identifier represents that the code string to be decoded does not include the residual image obtained in the encoding process step of the code string to be decoded, adds the residual decoded image generated by the predictive residual decoder 203 and the predictive image generated by the predictive decoder 205 to each other to generate and output a reconstructed image and, when the identifier represents that the code string to be decoded includes a residual image obtained in the encoding process step of the code string to be decoded, adds the residual image included in the second code string to be decoded and the predictive image generated by the predictive decoder 205 to each other to generate and output a reconstructed image.

The code string to be decoded preferably includes an identifier representing whether a residual decoded image obtained by locally decoding a residual coefficient in the encoding process step of the code string to be decoded is included in the code string to be decoded, the adder 207, when the identifier represents that the code string to be decoded does not include the residual decoded image obtained by locally decoding the residual coefficient obtained in the encoding process step of the code string to be decoded, adds the residual decoded image generated by the predictive residual decoder 203 and the predictive image generated by the predictive decoder 205 to each other to generate and output a reconstructed image and, when the identifier represents that the code string to be decoded includes the residual decoded image obtained by locally decoding the residual coefficient obtained in the encoding process step of the code string to be decoded, adds the residual decoded image included in the second code string to be decoded and the predictive image generated by the predictive decoder 205 to each other to generate and output a reconstructed image.

Preferably, when the header code string analyzer 201 accepts the second code string to be decoded, the predictive residual decoder 203 does not perform inverse quantization and the inverse orthogonal transformation to the coefficient code string.

Another Embodiment

A program including functions equivalent to the means included in the video image encoding device and the video image decoding device described in each of the embodiments is recoded on a recording medium such as a flexible disk, so that the processes described in the embodiments can be easily executed in an independent computer system. The recording medium is not limited to a flexible disk, and a recording medium such as an optical disk, an IC card, or a ROM cassette on which a program can be recorded can be used.

Functions equivalent to the means included in the video image encoding device and the video image decoding device described in the embodiments may be generated as LSIs serving as integrated circuits. The integrated circuits may be configured as one chip such that the chip includes some or all of the integrated circuits. Depending on degrees of integration, the LSI may be called an IC, a system LSI, a super LSI, or an ultra LSI.

The method of integrating circuits is not limited to that of an LSI, and the integrated circuits may be realized by dedicated circuits or general processors. After LSIs are manufactured, a programmable FPGA (Field Programmable Gate Array) or a configurable processor in which the connections and settings of circuit cells in the LSIs can be reconstructed may be used.

Furthermore, when a technique of an integrated circuit that can be replaced with the technique of an LSI appears because of the development of a semiconductor technique or other techniques derived from the semiconductor technique, functional blocks may be integrated by using the techniques as a matter of course.

The present disclosure may be applied to a broadcasting wave recording device such as a DVD recorder or a BD recorder that includes the video image encoding device and the video image decoding device described above and compresses and records a broadcasting wave transmitted from a broadcast station.

At least some of the functions of the video image encoding devices, the video image decoding device, and the modification thereof may be combined to each other.

INDUSTRIAL APPLICABILITY

The present disclosure is useful as a video image encoding device that encodes pictures configuring an input image in, for example, a video camera, a digital camera, a video recorder, a mobile phone, a personal computer, or the like to output the pictures as video image encoding data or a video image decoding device that decodes the video image encoding data to generate a decoded image.

What is claimed is:

1. An image encoding device that encodes an image, the image encoding device comprising:
   a processor; and
   a non-transitory memory having stored thereon executable instructions, which cause the processor to:
   generate a predictive image on a predictive unit for a current coding unit using predictive information, the prediction unit being included in the coding unit; and
   wherein in a first mode, the processor variable-length-codes a residual coefficient to generate a coefficient code string, the residual coefficient being generated by performing an orthogonal transformation process and a quantizing process on a differential image between the image to be encoded and the generated predictive image,
   wherein in a second mode, the processor directly uses the differential image to generate the coefficient code string without performing the orthogonal transformation process and the quantizing process, and wherein a syntax of the current coding unit includes flag information indicating whether the first mode or the second mode is applied for the current coding unit and the syntax is included in a syntax of the coding unit separate from a syntax of the prediction unit included in the syntax of the coding unit.

2. An image encoding method that encodes an image, the image encoding method comprising:

generating a predictive image on a predictive unit for a current coding unit using predictive information, the prediction unit being included in the coding unit; and wherein in a first mode, a coefficient code string is generated by variable-length-coding a residual coefficient, the residual coefficient being generated by performing an orthogonal transformation process and a quantizing process on a differential image between the image to be encoded and the generated predictive image, wherein in a second mode, the coefficient code string is generated by directly using the differential image without performing the orthogonal transformation process and the quantizing process, and wherein a syntax of the current coding unit includes flag information indicating whether the first mode or the second mode is applied for the current coding unit and the syntax is included in a syntax of the coding unit separate from a syntax of the prediction unit included in the syntax of the coding unit.

* * * * *